United States Patent
Bestaoui-Spurr et al.

(10) Patent No.: US 12,060,523 B2
(45) Date of Patent: *Aug. 13, 2024

(54) METHOD OF INTRODUCING OIL-SOLUBLE WELL TREATMENT AGENT INTO A WELL OR SUBTERRANEAN FORMATION

(71) Applicant: Baker Hughes Holdings LLC, Houston, TX (US)

(72) Inventors: Naima Bestaoui-Spurr, The Woodlands, TX (US); Francis H. DeBenedictis, Spring, TX (US); D. V. Satyanarayana Gupta, The Woodlands, TX (US); Sumit Bhaduri, The Woodlands, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/676,725

(22) Filed: Feb. 21, 2022

(65) Prior Publication Data
US 2022/0177775 A1    Jun. 9, 2022

Related U.S. Application Data

(63) Continuation-in-part of application No. 16/630,358, filed as application No. PCT/US2017/041904 on Jul. 13, 2017, now Pat. No. 11,254,861.

(51) Int. Cl.
*C09K 8/80* (2006.01)
*E21B 43/267* (2006.01)

(52) U.S. Cl.
CPC .............. *C09K 8/80* (2013.01); *E21B 43/267* (2013.01)

(58) Field of Classification Search
CPC .......... C09K 8/52; C09K 8/524; C09K 8/528; C09K 8/532; C09K 8/536; C09K 8/54;
(Continued)

(56) References Cited

U.S. PATENT DOCUMENTS

| 1,570,537 A | 1/1926 | Teitsworth |
| 2,378,155 A | 6/1945 | Newsome |

(Continued)

FOREIGN PATENT DOCUMENTS

| CA | 1262507 A | 10/1989 |
| EP | 0540204 A2 | 5/1993 |

(Continued)

OTHER PUBLICATIONS

P.J.C. Webb AEA Technology PLC, T.A., et al; Revolutionary New Chemical Delivery System for Fractured, Gravel Packed and Prepacked Screen Wells; SPE 38164; 1997.

(Continued)

*Primary Examiner* — Angela M DiTrani Leff
(74) *Attorney, Agent, or Firm* — John Wilson Jones; Jones Delflache LLP

(57) ABSTRACT

Oil-soluble well treatment agents may be slowly released into a well or a subterranean formation by use of an aqueous fluid of (i) an oil-in-water dispersion having the oil-soluble well treatment agent as a dispersed phase and (ii) a second component having an oil-soluble or water-soluble primer coated onto a portion of its surface. The amount of the oil-soluble well treatment agent in the oil-in-water dispersion is from 20 to 50 weight percent and the average particle size of the oil-soluble well treatment agent in the dispersion may be from 0.005 to 2 micrometers. The oil-in-water dispersion may further contain a water-soluble well treatment agent.

17 Claims, 1 Drawing Sheet

(58) Field of Classification Search
CPC ........ C09K 8/5753; C09K 8/58; C09K 8/605;
C09K 8/70; C09K 8/74; C09K 2208/10;
C09K 2208/32; C09K 2208/34; E21B
37/06; E21B 43/04; E21B 43/16; E21B
43/26
See application file for complete search history.

(56) References Cited

U.S. PATENT DOCUMENTS

| | | | |
|---|---|---|---|
| 3,179,170 A | 4/1965 | Burtch et al. | |
| 3,283,817 A | 11/1966 | Roberts | |
| 3,531,409 A | 9/1970 | Seffens et al. | |
| 3,722,592 A | 3/1973 | Bucaram et al. | |
| 3,782,469 A | 1/1974 | Fulford | |
| 3,850,248 A | 11/1974 | Carney | |
| 3,987,850 A | 10/1976 | Fitch | |
| 3,991,827 A | 11/1976 | Schall | |
| 4,008,763 A | 2/1977 | Lowe, Jr. | |
| 4,013,587 A | 3/1977 | Fischer et al. | |
| 4,108,779 A | 8/1978 | Carney | |
| 4,109,721 A | 8/1978 | Slusser | |
| 4,264,329 A | 4/1981 | Beckett | |
| 4,352,741 A | 10/1982 | Wernau | |
| 4,390,456 A | 6/1983 | Sanchez et al. | |
| 4,552,591 A | 11/1985 | Millar | |
| 4,582,131 A | 4/1986 | Plummer et al. | |
| 4,660,645 A | 4/1987 | Newlove et al. | |
| 4,670,166 A | 6/1987 | McDougall et al. | |
| 4,738,897 A | 4/1988 | McDougall et al. | |
| 4,905,762 A | 3/1990 | Zilch | |
| 4,986,353 A | 1/1991 | Clark et al. | |
| 5,073,276 A * | 12/1991 | Newlove ................. | C09K 8/82 507/224 |
| 5,102,558 A | 4/1992 | McDougall et al. | |
| 5,187,011 A | 2/1993 | Manalastas et al. | |
| 5,224,543 A | 7/1993 | Watkins et al. | |
| 5,225,123 A | 7/1993 | Torobin | |
| 5,243,190 A | 9/1993 | Bandy et al. | |
| 5,741,758 A | 4/1998 | Pakulski | |
| 5,758,725 A | 6/1998 | Streetman | |
| 5,892,147 A | 4/1999 | Games et al. | |
| 5,893,416 A | 4/1999 | Read | |
| 5,922,652 A | 7/1999 | Kowalski et al. | |
| 5,964,291 A | 10/1999 | Bourne et al. | |
| 6,025,302 A | 2/2000 | Pakulski | |
| 6,100,221 A | 8/2000 | Poelker et al. | |
| 6,209,643 B1 | 4/2001 | Nguyen et al. | |
| 6,209,646 B1 * | 4/2001 | Reddy ..................... | C09K 8/46 166/293 |
| 6,279,656 B1 | 8/2001 | Sinclair et al. | |
| 6,326,335 B1 | 12/2001 | Kowalski et al. | |
| 6,331,508 B1 | 12/2001 | Pakulski | |
| 6,380,136 B1 | 4/2002 | Bates et al. | |
| 6,439,310 B1 | 8/2002 | Scott, III et al. | |
| 6,527,051 B1 | 3/2003 | Reddy et al. | |
| 6,613,899 B1 | 9/2003 | Kuzzee et al. | |
| 6,645,769 B2 | 11/2003 | Tayebi et al. | |
| 6,723,683 B2 | 4/2004 | Crossman et al. | |
| 6,866,797 B1 | 3/2005 | Martin et al. | |
| 7,028,776 B2 | 4/2006 | Kirk | |
| 7,216,711 B2 | 5/2007 | Nguyen et al. | |
| 7,270,184 B2 | 9/2007 | Kotlar et al. | |
| 7,347,260 B2 | 3/2008 | Ferguson et al. | |
| 7,380,606 B2 | 6/2008 | Pursley et al. | |
| 7,419,937 B2 | 9/2008 | Rimmer et al. | |
| 7,426,961 B2 | 9/2008 | Stephenson et al. | |
| 7,459,209 B2 | 12/2008 | Smith et al. | |
| 7,491,682 B2 | 2/2009 | Gupta et al. | |
| 7,493,955 B2 | 2/2009 | Gupta et al. | |
| 7,494,711 B2 | 2/2009 | Kaufman et al. | |
| 7,500,522 B2 | 3/2009 | Skibinski et al. | |
| 7,560,690 B2 | 7/2009 | Stray et al. | |
| 7,598,209 B2 | 10/2009 | Kaufman et al. | |
| 7,686,081 B1 | 3/2010 | Becker | |
| 7,896,078 B2 | 3/2011 | Wang et al. | |
| 8,586,510 B2 | 11/2013 | McCabe et al. | |
| 8,596,354 B2 | 12/2013 | Hartshorne et al. | |
| 8,664,168 B2 | 3/2014 | Steiner | |
| 8,853,619 B2 | 10/2014 | Preudhomme et al. | |
| 9,010,430 B2 | 4/2015 | Darby et al. | |
| 9,029,300 B2 | 5/2015 | Gupta | |
| 9,102,860 B2 | 8/2015 | Cawiezel et al. | |
| 9,874,080 B2 | 1/2018 | Gupta et al. | |
| 9,926,485 B2 | 3/2018 | Yan et al. | |
| 9,976,070 B2 | 5/2018 | Gupta et al. | |
| 10,400,159 B2 | 9/2019 | Gupta | |
| 10,413,966 B2 | 9/2019 | Murugesan et al. | |
| 11,254,861 B2 * | 2/2022 | Bhaduri ................. | C09K 8/524 |
| 2001/0007351 A1 | 7/2001 | Acker et al. | |
| 2002/0128157 A1 | 9/2002 | Bates et al. | |
| 2003/0006036 A1 | 1/2003 | Malone et al. | |
| 2004/0043906 A1 | 3/2004 | Heath et al. | |
| 2004/0060702 A1 | 4/2004 | Kotlar et al. | |
| 2004/0074646 A1 | 4/2004 | Kotlar et al. | |
| 2004/0224155 A1 | 11/2004 | Barron et al. | |
| 2004/0244969 A1 | 12/2004 | Kotlar et al. | |
| 2005/0022991 A1 | 2/2005 | Rao | |
| 2005/0028976 A1 | 2/2005 | Nguyen et al. | |
| 2005/0034868 A1 | 2/2005 | Frost et al. | |
| 2005/0115710 A1 | 6/2005 | Kotlar et al. | |
| 2006/0065396 A1 | 3/2006 | Dawson et al. | |
| 2006/0091572 A1 | 5/2006 | Santra et al. | |
| 2006/0124301 A1 | 6/2006 | Gupta | |
| 2006/0124302 A1 | 6/2006 | Gupta et al. | |
| 2006/0194700 A1 | 8/2006 | Gatlin | |
| 2007/0036977 A1 | 2/2007 | Sinclair et al. | |
| 2007/0062101 A1 | 3/2007 | Delamotte et al. | |
| 2007/0095528 A1 | 5/2007 | Ziauddin et al. | |
| 2007/0173417 A1 | 7/2007 | Kaufman et al. | |
| 2007/0202318 A1 | 8/2007 | Smith et al. | |
| 2008/0035339 A1 | 2/2008 | Welton et al. | |
| 2008/0035340 A1 | 2/2008 | Welton et al. | |
| 2008/0053657 A1 | 3/2008 | Alary et al. | |
| 2008/0058228 A1 | 3/2008 | Wilson | |
| 2008/0058229 A1 | 3/2008 | Berkland et al. | |
| 2008/0078547 A1 | 4/2008 | Sinclair et al. | |
| 2008/0182765 A1 | 7/2008 | Pershikova et al. | |
| 2008/0210421 A1 | 9/2008 | Wilson et al. | |
| 2008/0217012 A1 | 9/2008 | Delorey et al. | |
| 2008/0269083 A1 | 10/2008 | Argillier et al. | |
| 2008/0287324 A1 | 11/2008 | Pursley et al. | |
| 2009/0025470 A1 | 1/2009 | Green et al. | |
| 2009/0038799 A1 | 2/2009 | Garcia-Lopez de Victoria et al. | |
| 2009/0114247 A1 | 5/2009 | Brown et al. | |
| 2009/0131285 A1 | 5/2009 | Wang et al. | |
| 2009/0178807 A1 | 7/2009 | Kaufman et al. | |
| 2009/0291861 A1 | 11/2009 | Sawdon | |
| 2009/0325825 A1 | 12/2009 | Gupta et al. | |
| 2010/0059224 A1 | 3/2010 | Palamara et al. | |
| 2010/0065275 A1 | 3/2010 | McGowen et al. | |
| 2010/0130385 A1 | 5/2010 | Guzmann et al. | |
| 2010/0175875 A1 | 7/2010 | Becker et al. | |
| 2010/0304418 A1 | 12/2010 | Moussavi et al. | |
| 2010/0307745 A1 | 12/2010 | Lafitte et al. | |
| 2011/0146974 A1 | 6/2011 | Hartshorne et al. | |
| 2012/0012326 A1 * | 1/2012 | Darby ..................... | E21B 37/06 166/310 |
| 2012/0273197 A1 | 11/2012 | Gupta | |
| 2012/0292025 A1 | 11/2012 | Stoll | |
| 2012/0318515 A1 | 12/2012 | Cawiezel et al. | |
| 2013/0029883 A1 | 1/2013 | Dismuke et al. | |
| 2013/0123149 A1 | 5/2013 | Berkland et al. | |
| 2013/0126158 A1 | 5/2013 | Gupta et al. | |
| 2013/0341012 A1 | 12/2013 | Belani et al. | |
| 2014/0000891 A1 * | 1/2014 | Mahoney ............... | C09K 8/805 507/224 |
| 2014/0048273 A1 | 2/2014 | Southwick et al. | |
| 2014/0190692 A1 | 7/2014 | Hibbeler et al. | |
| 2014/0209304 A1 | 7/2014 | Reed et al. | |
| 2014/0305650 A1 | 10/2014 | Song et al. | |
| 2015/0075792 A1 | 3/2015 | Brandl et al. | |
| 2015/0198010 A1 | 7/2015 | Doan et al. | |
| 2015/0330197 A1 | 11/2015 | Brannon et al. | |
| 2015/0369822 A1 | 12/2015 | Strandburg et al. | |

(56) References Cited

U.S. PATENT DOCUMENTS

| | | | |
|---|---|---|---|
| 2016/0009980 A1* | 1/2016 | Gupta | E21B 37/06 |
| | | | 507/202 |
| 2016/0030916 A1 | 2/2016 | Shen et al. | |
| 2016/0046855 A1 | 2/2016 | Mastrangelo et al. | |
| 2017/0198210 A1* | 7/2017 | Gupta | C04B 35/62813 |
| 2017/0226404 A1 | 8/2017 | Gupta | |
| 2017/0350236 A1 | 12/2017 | Shen et al. | |
| 2018/0134939 A1 | 5/2018 | Gupta et al. | |
| 2018/0155597 A1* | 6/2018 | Burns | C09K 8/03 |
| 2018/0298274 A1* | 10/2018 | Zhao | C09K 8/588 |
| 2018/0298277 A1* | 10/2018 | Borrell | E21B 47/11 |
| 2019/0161672 A1 | 5/2019 | Bottiglieri et al. | |
| 2020/0299560 A1 | 9/2020 | Bhaduri et al. | |

FOREIGN PATENT DOCUMENTS

| | | |
|---|---|---|
| EP | 1277051 B1 | 8/2006 |
| GB | 2298440 A | 9/1996 |
| GB | 2308129 A | 6/1997 |
| GB | 2520018 A | 5/2015 |
| WO | 97/45625 A1 | 12/1997 |
| WO | 99/36668 A1 | 7/1999 |
| WO | 99/54592 A1 | 10/1999 |
| WO | 200011949 A1 | 3/2000 |
| WO | 2001081914 A1 | 11/2001 |
| WO | 2002040827 A1 | 5/2002 |
| WO | 2004106942 A2 | 12/2004 |
| WO | 2005/017313 A1 | 2/2005 |
| WO | 2006129258 A1 | 12/2006 |
| WO | 2008032067 A1 | 3/2008 |
| WO | 2010007390 A2 | 1/2010 |
| WO | 2015174996 A1 | 11/2015 |
| WO | 2016014310 A1 | 1/2016 |
| WO | 2016089599 A1 | 6/2016 |
| WO | WO2016137922 A1 | 9/2016 |
| WO | 2019089043 A1 | 5/2019 |

OTHER PUBLICATIONS

P.J.C. Webb AEA Technology PLC, T.A., et al; Economic and Technical Advantages of Revolutionary New Delivery System for Fractured and Gravel Packed Wells; SPE 38548; 1997.

P.J.C. Webb AEA Technology PLC, T.A., et al; Economic and Technical Features of a Revolutionary Chemical Scale Inhibitor Delivery Method for Fractured and Gravel Packed Wells: Comparative Analysis of Onshore and Offshore Subsea Applications; SPE 39451; 1998.

Norris, et al; Maintaining Fracture Performance Through Active Scale Control; SPE 68300; 2001.

Norris, et al; Hydraulic Fracturing for Reservoir Management Production Enhancement, Scale Control and Asphaltine Prevention; SPE 71655; 2001.

McInnich, et al; New Relationship Between Oil Company and Service Company Rejuvenates a Mature North Sea Gas Field; SPE 78327; 2002.

Szymczak, et al; Long-Term Scale Inhibition Using a Solid Scale Inhibitor in a Fracture Fluid; SPE 102720; 2006.

Gupta, et al; Solid Production Chemicals Added With the Frac for Scale, Paraffin and Asphaltene Inhibition; SPE 119393; 2009.

Gupta, et al; Multi-Year Scale Inhibition from a Solid Inhibitor Applied during Stimulation; SPE 115655; 2008.

Smith, et al; Solid Paraffin Inhibitor Pumped in a Hydraulic Fracture Provides Long-Term Paraffin Inhibition in Permian Basin Wells; SPE 124868; 2009.

Pallanich; Slow-release medication relieves deepwater headache; Offshore Engineer; Aug. 2007.

Szymczak et al; Treat production problems before they occur; E&P; Jul. 2008.

Weirich et al., Field Application of Chemically Treated Substrate in Pre-Packed Well Screen; SPE 141054; Society of Petroleum Engineers; Manama Bahrain, Mar. 2011.

Sasol Germany Gmbh; "Boehmite, High Purity Alumina and Hydrotalcite"; Sasol Germany GmbH; Hamburg Germany, Aug. 2007.

Sasol; "Aluminum Oxide, A1203"; Material Safety Data Sheet; version 1.2; Sasol; Hamburg Germany; Aug. 2007.

Carbo Ceramics "Carbo EconoProp"; Carbo Ceramics; Houston, Texas; 2010.

D.M. Frigo et al; Chemical Inhibition of Halite Scaling in Topsides Equipment; SPE 60191; 2000.

Berlin et al., "Engineered Nanoparticles for Hydrocarbon Detection in Oil-Field Rocks," SPE 141528 Apr. 11, 2011 (in 2 parts).

Nyhavn, et al. "Permanent Tracers Embedded in Downhole Polymers Prove Their Monitoring Capabilities in a Hot Offshore Well," SPE 135070, Sep. 19, 2010.

Fuller, et al., Applying Biochemistry Concepts to the Analysis of Oilfield Produced Fluids, SPE 124749, Oct. 2009.

Optidose (TM) 1000 Traceable Polymer, a Tool for Maintaining Maximum Heat Transfer, Technical Data Sheet, Jul. 2012, The Dow Chemical Co.

Accent (TM) Traceable Scale Inhibitor System, Sep. 2010, The Dow Chemical Co., Jun. 2012.

Himes, et al., Search4Oil, Comparative Study of Flowback Analysis Using Polymer Concentrations and Fracturing—Fluid Tracer Methods: A Field Study, SPE 101614-PA, May 2008.

Liang, F., et al., "A comprehensive review on proppant technologies," Petroleum 2015, Nov. 5, 2015.

Frenier, W.W., et al., A Multifaceted Approach for Controlling Complex Deposits in Oil and Gas Production, Society of Petroleum Engineers, Sep. 22, 2010.

* cited by examiner

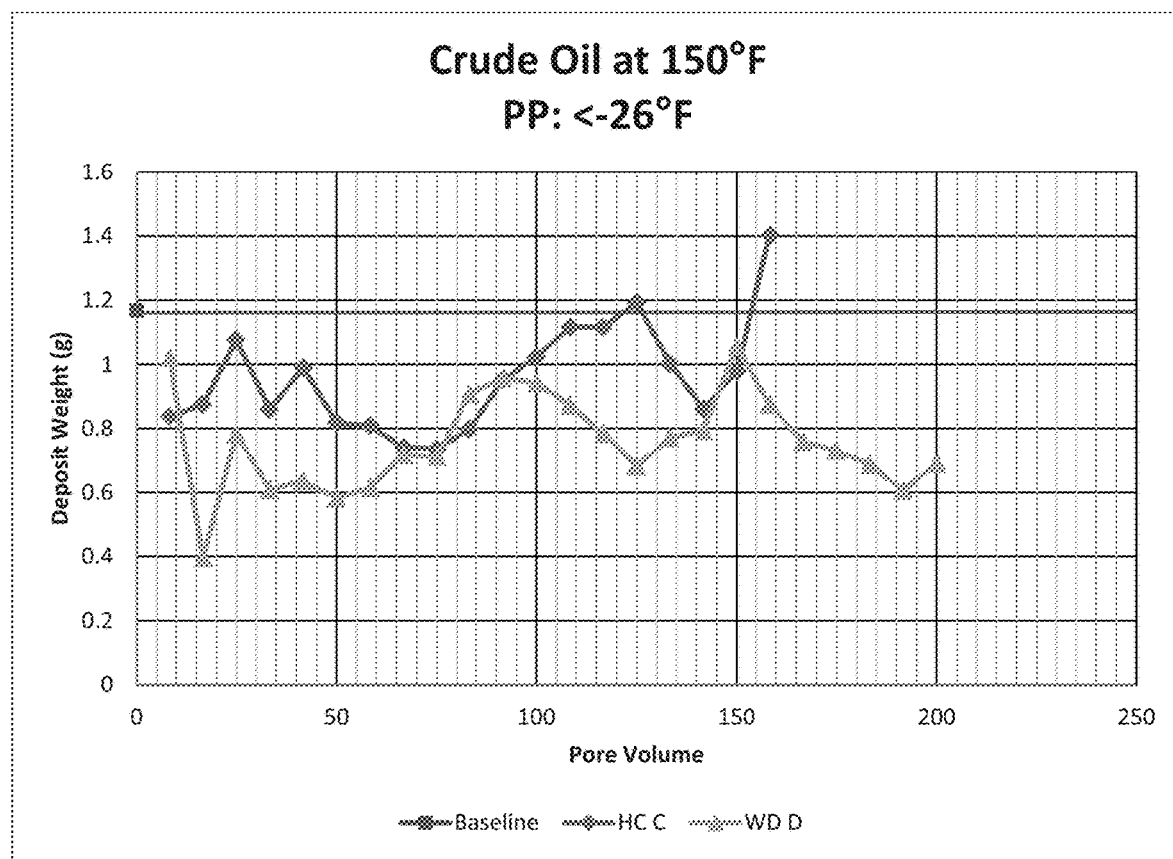

METHOD OF INTRODUCING OIL-SOLUBLE WELL TREATMENT AGENT INTO A WELL OR SUBTERRANEAN FORMATION

This application is a continuation-in-part of U.S. patent application Ser. No. 16/630,358 filed on Jan. 10, 2020 which is a national stage application under U.S.C. § 371 of PCT/US2017/041904 filed on Jul. 13, 2017, both of which are herein incorporated by reference.

FIELD OF THE DISCLOSURE

The disclosure relates to a delivery system for oil-soluble well treatment agents into a well or a subterranean formation penetrated by the well. The delivery system includes an aqueous fluid having an oil-in-water dispersion wherein an oil-soluble well treatment agent is the dispersed oil phase. The oil-soluble well treatment agent of the dispersion is associated with a solid second component. A portion of the surface of the second component may be coated with a primer which enhances association of the oil-soluble well treatment agent to the solid second component.

BACKGROUND OF THE DISCLOSURE

Fluids produced from oil and/or gas wells typically contain a complex mixture of components including aliphatic hydrocarbons, aromatics, hetero-atomic molecules, anionic and cationic salts, acids, sands, silts and clays. The nature of these fluids combined with the severe conditions of heat, pressure, and turbulence to which they are often subjected, are contributory factors to corrosion, paraffin deposition, and asphaltene precipitation as well as scale and salt formation in the well, subterranean formation penetrated by the well and equipment within the well.

Such contaminants typically restrict the movement of fluids in production piping and further plug flow paths of fluids (including reservoir flow paths). The formation and deposition of such contaminants typically decreases permeability of the subterranean formation, reduces well productivity, and, in some cases, completely blocks the tubing. In addition, such conditions shorten the lifetime of production equipment.

Further, asphaltenes adversely impact the viscosity and flow behavior of crude oil and are known to have deleterious effects on the extraction of oil. For instance, asphaltenes tend to precipitate at lower reservoir pressure or onset pressure; the precipitates blocking production routes and tubing. In addition, asphaltene precipitates flocculate and form deposits in the pores of the formation, coat boreholes and solidify in downhole equipment. Wells with excessive asphaltene deposition incur high remediation costs and are exposed to levels of formation damage that can greatly shorten the productive life of the well.

Well treatment agents are often used in production wells to prevent the deleterious effects caused by such deposits and precipitates. For instance, the deposition of paraffins and asphaltenes are often controlled using paraffin inhibitors and asphaltene inhibitors, respectively. Typically, such inhibitors are soluble in oil and insoluble in water.

Chemical treatment agents may be delivered to deposits by the technique of "downhole squeezing" wherein a slug of a well treatment composition is injected into the annulus of the well, using a pre-flush, squeeze, and over flush treatment before the well can be returned to normal function. This technique requires large volumes of treatment and flush fluid in horizontal wells with a large area of perforated interval. Further treatments are typically required as the chemical residual is depleted, once again requiring large volumes of flush and treatment into the well. Such treatment methods are typically inefficient in horizontal wells because it is difficult to ensure the treatment is delivered to all the intended area. Further, the flush and chemical additives often require large pumps and holding tanks which can add significant costs to the application.

Solid chemical additives in the form of a slurry are further often used. This type of treatment is effective in vertical wells but requires a flush to aid in delivery of the treatment agent to the bottom of the well. In a deviated well such as a horizontal well or well with multiple deviations such as an "S" shaped completion, it is important that the slurry mass not be too heavy for the flush to be carried past the deviation. If the density of the slurry is too high, the slurry just settles beyond the deviation.

Capillary tubing lengths are frequently installed in wells to aid in delivery of a chemical treatment. This technique is effective in its intended function but is expensive and requires specialized equipment to install. Further, capillary tubing may not be able to extend to great depths if the deviation angle is severe or the piping extends far beyond the bend.

While solid additives have been added to the well during the completion stage, this technique has only been proven to be an effective delivery method in new wells when the opportunity to spot the chemical additive is available.

Other methods for introducing well treatment agents into production wells include forcing a liquid well treatment agent into a targeted zone of a formation by application of hydraulic pressure from the surface. In most cases, such treatments are performed at downhole injection pressures below that of the formation fracture pressure. Alternatively, the delivery method may consist of placing a solid well treatment agent into the producing formation in conjunction with a hydraulic fracturing operation. This method is often preferred because it puts the treatment agent in contact with the fluids contained in the formation before such fluids enter the wellbore where deleterious effects are commonly encountered.

A principal disadvantage of such methods is the difficulty in releasing the well treatment agent into the well over a sustained period. As a result, treatments must repeatedly be undertaken to ensure that the requisite level of treatment agent is continuously present in the well. Such treatments result in lost production revenue due to down time.

U.S. Pat. Nos. 7,491,682 and 7,493,955 disclose methods of treating a well by pumping an aqueous fluid into the well having a composite containing a well treatment agent adsorbed onto a water-insoluble adsorbent, such as diatomaceous earth. Such methods have limited applicability however, when the well treatment agent is oil-soluble. The amount of oil-soluble well treatment agent which can be loaded onto the adsorbent is constrained. For instance, at loadings in excess of 12 wt. %, in a hydrocarbon carrier solvent, the fluids containing the composite (consisting of polymeric inhibitors) become too viscous. Composites having an excess of oil-soluble well treatment agents are thus incompatible with aqueous based fracturing fluids due to the separation of the aqueous and organic phases.

Alternative methods of delivering oil-soluble well treatment agents agent into the well and/or formation are needed.

It should be understood that the above-described discussion is provided for illustrative purposes only and is not intended to limit the scope or subject matter of the appended claims or those of any related patent application or patent.

Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

In an embodiment of the disclosure, a method of treating a well or a subterranean formation penetrated by a well is provided by pumping into the well an aqueous treatment fluid having at least one oil-insoluble, water-insoluble composite. The composite contains from about 20 to about 50 wt. % of one or more immobilized oil-soluble well treatment agents having an average particle size less than or equal to 1 micrometer. The composite contains the oil-soluble well treatment agent which is associated with a second component.

In another embodiment, a method of treating a well or subterranean formation penetrated by a well is provided wherein an aqueous treatment fluid is pumped into the well, the aqueous treatment fluid having a water-insoluble, oil-insoluble composite. The composite contains one or more oil-soluble well treatment agents. The well treatment agent may be a paraffin inhibitor, corrosion inhibitor, asphaltene inhibitor, an oil-soluble scale inhibitor or a combination thereof. The well treatment agent of the composite is immobilized by or with a second component. The amount of the oil-soluble well treatment agent in the composite is between from about 20 to about 50 weight percent based on the total weight of the composite.

In another embodiment of the disclosure, a method of treating a subterranean formation or a well penetrated by the formation is provided wherein a composite is pumped into the well, the composite being formed from an aqueous dispersion comprising a dispersing agent and at least one oil-soluble well treatment agent and at least one water-soluble well treatment agent. The oil-soluble well treatment agent(s) and the water-soluble well treatment agent(s) are immobilized by or with a second component. The oil-soluble well treatment agent may be a paraffin inhibitor, asphaltene inhibitor, corrosion inhibitor or a mixture thereof. The water-soluble well treatment agent may be a corrosion inhibitor, scale inhibitor, salt inhibitor, biocide, or a combination thereof. The average particle size of the oil-soluble well treatment agent in the dispersion is less than or equal to 1 micrometer. The amount of the oil-soluble well treatment agent in the dispersion is between from about 25 to about 60 weight percent. The amount of the water-soluble well treatment agent in the dispersion is between from about 0.01 to about 12 weight percent.

In another embodiment of the disclosure, an oil-insoluble, water-insoluble well treatment composite comprising is provided, the composite containing an oil-soluble well treatment agent as a first component which is immobilized by or with a second component. The amount of the oil-soluble well treatment agent in the composite is between from about 20 to about 50 weight percent. The average particle size of the oil-soluble well treatment agent in the composite is less than or equal to 1 micrometer. The composite may be prepared by contacting the second component with an aqueous dispersion composition containing a dispersant and an oil-in-water dispersion having the oil-soluble well treatment agent as the oil phase. The amount of the oil-soluble well treatment agent in the composite is at least 1.75 times greater than a composite containing the same oil-soluble well treatment agent and second component which is prepared by contacting the oil-soluble well treatment agent in an oil carrier with the second component.

In another embodiment, a method of treating a well or a subterranean formation penetrated by a well is provided wherein an aqueous fluid is pumped into the well. The aqueous fluid comprises an oil-in-water dispersion having an oil-soluble well treatment agent as dispersed oil phase. The aqueous fluid further comprises a second solid component. The oil-soluble well treatment agent of the oil-in-water dispersion is immobilized by the second component by being adsorbed onto a surface of the second component, absorbed into a matrix of the second component or absorbed or adsorbed onto or into the pores of the second component.

In yet another embodiment, a method of treating a well or a subterranean formation penetrated by a well is provided wherein an aqueous fluid having an oil-in-water dispersion is pumped into the well. The oil-in-water dispersion has an oil-soluble well treatment agent as dispersed oil phase. The aqueous fluid further contains a second component having an oil or water-soluble primer coated onto a portion of its surface. The oil-soluble well treatment agent of the oil-in-water dispersion is immobilized by the second component by being adsorbed onto a surface of the second component, absorbed into a matrix of the second component or absorbed or adsorbed onto or into the pores of the second component. The primer promotes association of the oil-soluble well treatment agent of the oil-in-water dispersion with the surface of the second component.

In still another embodiment, a method of treating a well or a subterranean formation penetrated by a well is provided wherein an aqueous fluid is first pumped into the well. The aqueous fluid comprises (i) an oil-in-water dispersion having an oil-soluble well treatment agent as dispersed oil phase as well as (ii) a solid second component. A portion of the oil-soluble well treatment agent is immobilized onto the second component by adsorbing the oil-soluble well treatment agent of the dispersion onto a surface of the second component, absorbing the oil-soluble well treatment agent into a matrix of the second component or absorbing or adsorbing the oil-soluble well treatment onto or into the pores of the second component. A portion of the second component is coated with an oil-soluble or water-soluble primer. A second portion of the oil-soluble well treatment agent is immobilized by its association with the primer coating.

BRIEF DESCRIPTION OF THE DRAWINGS

The FIGURE illustrates the efficacy of the composite of the disclosure compared to a composite of the prior art in the inhibition of paraffin; the composite of the disclosure having a higher loading of well treatment agent than the composite of the prior art.

DETAILED DESCRIPTION OF THE PREFERRED EMBODIMENTS

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

The delivery system disclosed herein may include composites formed by association of a solid component with an oil-in-water dispersion containing a dispersed oil-soluble well treatment agent. The composites are compatible with aqueous based fluid treatments. In addition, the composites may be added directly to hydrocarbon based fluids. The composites allow flow assurance protecting the proppant pack and wellbore against harmful permeability damaging deposits. (As used herein, the terms "soluble" and "insoluble" shall refer to solubility conditions at room temperature.)

As used herein, the term "oil-soluble well treatment agent" shall include an oil-soluble, water-insoluble treatment agent. As used herein, the term "water-soluble well treatment agent" shall include an oil-insoluble, water-soluble well treatment agent. As used herein, the term "associated" refers to the *nexus* between the well treatment agent(s) of the oil-in-water dispersion and the second component which enables them to be combined to form a composite. The term "associated" shall not be restricted however to a chemical reaction between the treatment agent and the second component. As discussed further, the term may refer to adsorption of the well treatment agent onto the surface of the second component, absorption of the well treatment agent into the matrix of the second component, absorption or adsorption of the well treatment agent onto or into the pores of the second component, immobilization of the well treatment agent on or within the second component, mixture with a binder (the second component) when compressed to form a shaped article, etc.

Over time, the oil-soluble well treatment agent disassociates from the second component under in-situ conditions. In an exemplary embodiment, the composites inhibit the formation of contaminants, control the formation of contaminants as well as retard the release of contaminants into the well.

The composite may be used in completion or production services. The composites may be used to remove contaminants from or control the formation of contaminants onto tubular surface equipment within the wellbore.

The oil-soluble well treatment agent of the dispersion may slowly be released into the produced fluid as it is solubilized. As such, the well treatment agent may be solubilized in produced oil. When the composite further contains a water-soluble well treatment agent, the water-soluble well treatment agent may be solubilized in produced water or other aqueous fluids in the well or subterranean formation.

The oil-soluble well treatment agent is the dispersed oil phase of the oil-in-water dispersion. As such, the particle size distribution [defined as volume average particle diameter (Dv) divided by number average particle diameter (Dn)] of the oil-soluble treatment agent in the dispersion is equal to or less than 2.5, preferably equal to or less than 2.0. In other embodiments, the oil-soluble well treatment agent of the dispersion has a particle size distribution less than or equal to 1.9, 1.7, or 1.5.

A preferred volume average particle size of the oil-soluble well treatment agent in the oil-in-water dispersion may be from about 2 to about 5 microns though in some instances the average particle size is equal to or less than 2 micron (μm), preferably equal to or less than 1.5 μm, preferably equal to or less than 1.2 μm, and more preferably equal to or less than 1 μm. In other embodiments, the average particle size ranges from 0.005 μm to 1 μm. In still other embodiments, the average particle size ranges from 0.5 μm to 1.2 μm, preferably 0.5 μm to 1 μm. For particles that are not spherical the diameter of the particle is the average of the long and short axes of the particle. Particle sizes can be measured on a Coulter LS230 light-scattering particle size analyzer or another suitable device.

In an embodiment, the oil-in-water dispersion is associated with a second solid component. The oil-soluble well treatment agent of the dispersion may be adsorbed onto at least a portion of the surface of solid component. In another embodiment, the oil-soluble well treatment agent of the oil-in-water dispersion may be absorbed into the pores of the second component. In another embodiment, the well treatment agent may be impregnated within the second component.

The oil-soluble well treatment agent is typically a paraffin inhibitor, an asphaltene inhibitor, a corrosion inhibitor, an oil-soluble scale inhibitor or a combination thereof.

The composite may be prepared by contacting the second component with the oil-in-water dispersion. The oil-soluble well treatment agent constitutes the oil phase of the dispersion. In addition, the dispersion may contain a dispersing agent. The amount of the oil-soluble well treatment agent(s) in the oil-in-water dispersion is typically from about 25 to about 60 weight percent.

The dispersing agent aids in the formation and/or stabilization of the aqueous dispersion. Suitable dispersing agents are anionic, cationic, zwitterionic or non-ionic surfactants.

Anionic surfactants include substances containing a lipophilic tail bonded to a water-soluble (hydrophilic) group; the hydrophilic group containing an anionic moiety such as a carboxylic acid, sulfonic acid, or phenolic group, neutralized by a cation such as an alkali metal or ammonium. The lipophilic tail is preferably an alkyl group, typically having about 8 to about 25 carbon atoms. Typical anionic surfactants include carboxylic acids or salts thereof such as fatty acids/salts having the formula $R_1COOR_2$ wherein $R_1$ is a straight chain, saturated or unsaturated, hydrocarbon radical of about 8 to about 25 carbon atoms and $R_2$ is —H or a base-forming radical such as Li, Na, K, or $NR_4$ (R is independently hydrogen, alkyl, aryl or arylalkyl). Alternatively, $R_2$ may be a divalent or polyvalent metal, the number of acid groups being that necessary to provide the neutral salt. Valent metal ions include Mg, Ca, Sr, Ba, Cr, Mn, Fe, Co, Ni, Cu, Zn, Sn as well as Pb. Typical fatty acid salts include sodium stearate, sodium palmitate, ammonium oleate, and triethanolamine palmitate. Additional carboxylic acids/salts useful as anionic surfactants include acids/salts, and especially sodium and potassium salts, of coconut oil fatty acids and tall oil acids as well as other carboxylic acids salt compounds including amine salts such as triethanolamine salts, acylated polypeptides, and salts of N-lauryl sarcosine such as N-dodecanoyl-N-methylglycine sodium salt. Preferred dispersing agents are behenic acid, erucic acid, sodium or potassium salts of oleic acid, stearic acid, behenic acid or erucic acid and/or mixtures thereof. Erucic acid may be in the form of rapeseed oil, a natural oil that contains approximately 40 to 50 weight percent erucic acid with the remainder consisting primarily of chains having 18 carbon atoms.

Other anionic surfactants include alkyl, arene and alkylarene sulfonates such as alkylbenzene sulfonate, linear alkylbenzene sulfonates, sodium tetrapropylene benzene sulfonate, sodium dodecylbenzene sulfonate, benzene-, toluene-, xylene-, and cumene sulfonates, lignin sulfonates, petroleum sulfonates, paraffin sulfonates, secondary n-alkanesulfonates, alpha-olefin sulfonates, alkylnaphthalene sulfonates; n-acyl-n-alkyltaurates; sulfosuccinate esters; isothionates; alkyl sulfates of the formula $R_2SO_4R_1$ or alkyl sulfonates of the formula $R_1SO_3R_2$ wherein $R_1$ and $R_2$ are as defined above, such as lithium dodecyl sulfate, sodium dodecyl sulfate, potassium dodecyl sulfate, and sodium tetradecyl sulfate; such as sodium lauryl sulfonate; sulfated and sulfonated amides and amines; sulfated and sulfonated esters such as lauric monoglyceride sodium sulfate, sodium sulfoethyl oleate, and sodium lauryl sulfoacetate; sulfuric acid ester salts such as sulfated linear primary alcohols, sulfated polyethoxylated straight chain alcohols and sulfated triglyceride oils; phosphoric and polyphosphoric acid esters; perfluorinated carboxylic acids; and polymeric anionic surfactants such as alginic acids.

Also included are polymeric anionic surfactants such as salts of polymers of alkyl acrylates and/or alkyl methacrylates and acrylic and/or methacrylic acid, and salts of partial esters of maleic anhydride-styrene copolymers. An anionic surfactant may be the salt of an acid precursor reacted with a basic material to form the salt. Preferably, the acid precursor is neutralized in situ to form the salt.

Other anionic surfactants are overbased or superbased materials, i.e., basic metal salts, preferably alkali or alkaline earth metal salts, of acidic organic compounds (carboxylic acids, sulfonic acids, phosphonic acids, phenols, etc.). Overbased materials are generally single phase, homogeneous Newtonian systems characterized by a metal content more than that present for neutralization based on the stoichiometry of the metal and the acidic organic compound reacted with the metal. Suitable overbased or superbased materials may be those set forth in U.S. Pat. Nos. 2,501,731; 2,616,905; 2,616,911; 2,616,925; 2,777,874; 3,256,186; 3,384,585; 3,365,396; 3,320,162; 3,318,809; 3,488,284; and 3,629,109.

Exemplary cationic surfactants are long-chain amines and their salts; such as primary amines derived from animal and vegetable fatty acids and tall oil and synthetic $C_{12}$ to $C_{18}$ primary, secondary, or tertiary amines; diamines and their salts, quaternary ammonium salts including tetraalkylammonium salts and imidazolinium salts derived from e.g. tallow or hydrogenated tallow, or N-benzyl-N-alkyl-dimethylammonium halides; polyethoxylated long-chain amines; quaternized polyethoxylated long-chain amines; and amine oxides such as N-alkyldimethylamine oxides such as cetyl dimethylamine oxide or stearyl dimethylamine oxide.

Exemplary zwitterionic surfactants include amino acids such as beta-N-alkylamino-propionic acids, N-alkyl-beta-iminodipropionic acids, imidazoline carboxylates, N-alkyl-betaines, sulfobetaines, and sultaines.

Exemplary nonionic surfactants include polyethoxylated alkylphenols such as polyethoxylated p-nonylphenol, p-octylphenol, or p-dodecylphenol; polyethoxylated straight-chain alcohols derived from coconut oil, tallow, or synthetic materials including oleyl derivatives; polyethoxylated polyoxypropylene glycols (block copolymers of ethylene oxide and propylene oxide), typically having molecular weights of 1000 to 30,000; polyethylene glycol; polyethoxylated mercaptans; long-chain carboxylic acid esters including glyceryl and polyglyceryl esters of natural fatty acids, propylene glycol esters, sorbitol esters, polyethoxylated sorbitol esters, polyoxyethylene glycol esters, and polyethoxylated fatty acids; alkanolamine condensates, such as the condensates made by reaction of methyl or triglyceride esters of fatty acids with equimolar or twice equimolar amounts of alkanolamine; tertiary acetylenic glycols; polyethoxylated silicones, prepared by reaction of a reactive silicone intermediate with a capped allyl polyalkylene oxide such as propylene oxide or mixed ethylene oxide/propylene oxide copolymer; N-alkylpyrrolidones, and alkylpolyglycosides (long chain acetals of polysaccharides). Further nonionic surfactants include ethoxylated coco amide; oleic acid; t-dodecyl mercaptan; modified polyester dispersants; ester, amide, or mixed ester-amide dispersants based on polyisobutenyl succinic anhydride; dispersants based on polyisobutyl phenol; ABA type block copolymer nonionic dispersants; acrylic graft copolymers; octylphenoxypolyethoxyethanol; nonylphenoxypolyethoxyethanol; alkyl aryl ethers; alkyl aryl polyethers; amine polyglycol condensates; modified polyethoxy adducts; modified terminated alkyl aryl ethers; modified polyethoxylated straight chain alcohols; terminated ethoxylates of linear primary alcohols; high molecular weight tertiary amines such as 1-hydroxyethyl-2-alkyl imidazolines; oxazolines; perfluoralkyl sulfonates; sorbitan fatty acid esters; polyethylene glycol esters; aliphatic and aromatic phosphate esters. Also included are the reaction products of hydrocarbyl-substituted succinic acylating agents and amines. Also included amongst nonionic surfactants are functionalized polysiloxanes containing amino, amido, imino, sulfonyl, sulfoxyl, cyano, hydroxy, hydrocarbyloxy, mercapto, carbonyl (including aldehydes and ketones), carboxy, epoxy, acetoxy, phosphate, phosphonyl, and haloalkyl groups. Such polysiloxanes can be linear or branched and generally have molecular weight above 800, typically up to 20,000. The functionality can be randomly distributed on the polymer chain or present in blocks. The functionality can be present as alkyl or alkylaryl groups as well as groups such as $-(C_2H_4O)_a-(C_3H_6O)_b-R$ where a and b are independently numbers from 0 to about 100 provided that at least one of a or b is at least 1, and R is H, acetoxy, or a hydrocarbyl group. Other suitable substituent groups include $C_3H_6X$, where X is OH, SH, or $NH_2$. Suitable nonionic surfactants further include polyoxyalkenealkyl alcohols or phenols, such as ethoxylated nonylphenol; alkanoates (preferably partial alkanoates) of polyalcohols, such as glyceryl monooleate, glyceryl monolaurate, sorbitan monooleate, sorbitan sesquioleate, sorbitan monolaurate, and sorbitan sesquilaurate, and 4,4-bishydroxylmethyl-2-heptadecenyl-2-oxazoline. Preferred materials include tall oil fatty acid neutralized with diethanolamine; polyoxyalkyene oxide octylphenols having from 1 to 70 ethylene oxide units and nonylphenols with 4 to 40 ethylene oxide units. The foregoing commercial materials are generally linear primary alcohol ethoxylates, secondary alcohol ethoxylates, or branched alkylphenol ethoxylates.

Preferably the dispersing agent in oil-in-water dispersion is 1 weight percent or higher, more preferably 2 weight percent or higher and more preferably 3 weight percent or higher based on the total weight of the oil-in-water dispersion. Preferably the amount of dispersing agent in the dispersion is 10 weight percent or less, more preferably 9 weight percent or less, and more preferably 8 weight percent or less based on the total weight of the oil-in-water dispersion.

The oil-in-water dispersion optionally contains a stabilizing agent to maintain product stability. Preferably, the dispersion is stable between 40° C. and −40° C. The stabilizing agent may also provide shear stability protection to allow the product to be transferred via a number of different pumping systems. Suitable stabilizing agents may be monomeric surfactants, polymeric stabilizing agents, and/or mixtures thereof.

Preferred monomeric stabilizers are polyethoxylated nonionic surfactants. Most preferred are those having hydrophilic lipophillic balance (HLB) values of equal to or less than 16, more preferably HLB values equal to or less than 12, and most preferably those having HLB values equal to or less than 10.

A preferred nonionic surfactant as stabilizing agent contains a hydrophobic part comprising hydrocarbyl groups and a hydrophilic part containing ethoxy groups. The preferred surfactant has a hydrophobic part that is either free of a phenolic group and contains 6 to 12 (more preferably 8 to 11) carbon atoms or that contains a phenolic group that is connected to 8 or 9 carbon atoms (an octyl phenol or nonyl phenol, respectively) and the preferred surfactant has a hydrophile that contains 1 to 6 ethoxy groups (more preferably 2 to 4).

Other polymeric stabilizers include polyvinyl alcohol or ionomers and/or salts of ethylene acrylic acid copolymers, ethylene methacrylic acid copolymers, polyacrylic acid polymers and co-polymers and associative types of acrylic and urethane co-polymers. The preferred polymeric stabilizers are polyacrylic polymers and ethylene acrylic acid copolymers.

The amount of stabilizing agent is typically from about 0.5 weight percent to 10 weight percent based on the total weight of the oil-in-water dispersion. More preferably from about 0.5 weight percent to 7 weight percent, and even more preferably from 0.5 weight percent to 5 weight percent based on the total weight of the oil-in-water dispersion.

The oil-in-water dispersion may also contain one or more additional additive or mixtures of additives, for example, biocides, anti-foaming agents, etc. Such additives are typically added in amounts less than 1 percent by weight based on the total weight of the oil-in-water dispersion.

The oil-soluble well treatment agent may be supplied in a dispersion in a liquid medium, preferably comprising water, in which it is not normally soluble at 10° C., and preferably also not soluble at ambient temperature, i.e., about 20° C., or even 30° C. or 40° C. The medium is preferably, first, a liquid at ambient temperature and preferably has a freezing point of 10° C. or below. Some preferred media have freezing points as low as 0° C., −20° C., −30° C., −40° C. or below. Moreover, the medium does not dissolve a substantial amount of the oil-soluble well treatment agent at such temperatures, preferably, ambient temperature. More specifically, the medium preferably dissolves less than 4 weight percent, more preferably less than 2 or even 1 weight percent, of the oil-soluble well treatment agent at ambient temperature or moderately elevated temperatures. (In some cases, the amount of actual oil-soluble well treatment agent which dissolves is less than 0.5 weight percent.) Preferably the medium remains a non-solvent to 30° C. or more preferably to 40° C. or 50° C. or higher.

For the liquid medium to be a nonsolvent for the oil-soluble well treatment agent, the medium should generally have a suitable degree of polarity. In one embodiment, the molecules of the solvent will preferably have 10 to 80 percent by weight heteroatoms such as oxygen or nitrogen, more preferably 20 to 70 percent, and still more preferably 25 to 60 percent by weight. Alternatively, the medium may have a dielectric constant of at least 3, preferably at least 10.

The liquid medium of the dispersion composition is water. As defined herein, aqueous means containing, dissolved in, or dispersed in water. The aqueous dispersion is preferably hydrocarbon solvent-free. The carrier fluid may be salt water, fresh water, a brine such as a saturated potassium chloride or sodium chloride solution.

Suitable liquid media include acetates (e.g., 2-ethoxyethyl acetate), ketones (e.g., acetone, butanone, pentanone, hexanone), or preferably, aqueous glycol mixtures (e.g., mixtures of ethylene glycol and water). Among the materials which can be used alone or in combination with water are ethylene glycol and its derivatives, such as the monomethyl ether, the monoethyl ether, the monopropyl ether, the monobutyl ether, and the monohexyl ether; diethylene glycol and its derivatives, such as the monomethyl ether, the monoethyl ether, the monopropyl ether, the monobutyl ether, and the monohexyl ether; propylene glycol and its derivatives, including the monomethyl ether, the monopropyl ether, and the monobutyl ether; and dipropylene glycol and its derivatives, such as the monomethyl ether, the monopropyl ether, and the monobutyl ether. Other suitable types of materials useful as the liquid medium for the present invention include lactones such as butyrolactone, and alcohols such as butanol, diacetone alcohol (4-hydroxy-4-methyl-2-pentanone) 2,6-dimethyl-4-heptanol, hexanol, isopropanol, 2-ethylhexanol, and 1-pentanol.

Where it is advantageous to have an aqueous dispersion with a freezing point equal to or less than 0° C., preferably equal to or less than −10° C., more preferably equal to or less than −20° C., more preferably equal to or less than −30° C., more preferably equal to or less than −40° C., and even more preferably equal to or less than −50° C., a freezing point depressant may be included. Such depressants include sodium chloride, potassium chloride, calcium chloride, etc.; monohydric alcohols such as methanol, ethanol, propanol, etc.; polyhydric alcohols such as ethylene glycol, propylene glycol and glycerine, etc.; glycol ethers such as ethyl, propyl, butyl, and hexyl ethers of ethylene glycol; diethylene glycol; propylene glycol, etc.

The amount of freezing point depressant incorporated in the oil-in-water dispersion is dependent on the desired freezing point of the dispersion. In general, one or more such freezing point depressants can be used in an amount equal to or greater than 5 weight percent, preferably equal to or greater than 10 weight percent, and more preferably equal to or greater than 15 weight percent based on the final weight of the dispersion.

The liquid medium can also be a mixture of any of the foregoing materials, including mixtures with water, as long as the pour point depressant is substantially insoluble in such mixtures. If the liquid medium is a mixture of a glycol and water, the relative amounts of the materials are such that the water component will not freeze even at low temperatures such as 0° C. to −40° C. Preferred weight ratios for such water:glycol mixtures are: 40:60, 50:50, 60:40 to 70:30.

Preferably the amount of liquid medium in the oil-in-water dispersion is an amount equal to or greater than 35 weight percent, more preferably in an amount equal to or greater than 40 weight percent, and more preferably in an amount equal to or greater than 45 weight percent based on the total weight of the oil-in-water dispersion. Preferably the liquid medium is in an amount equal to or less than 75 weight percent, more preferably in an amount equal to or less than 70 weight percent, and more preferably in an amount equal to or less than 65 weight percent based on the total weight of the oil-in-water dispersion.

Suitable dispersions are those set forth in U.S. Patent Publication No. 2015/0369822, herein incorporated by reference.

Suitable oil-soluble paraffin inhibitors include acrylates and methacrylates with pendant groups of $C_{16}$ to $C_{50}$, as well as polymers with long repeating saturated carbon chain segments such as ethylene vinyl acetate copolymers. These include but are not limited to acrylate or methacrylate esters of long chain alcohols, long chain alcohol esters of maleic acid, long chain fatty acid esters of acrylate and methacrylate polymers, maleic olefin alkyl esters, and ethylene vinyl acetate polymers of varying molecular weights. Further, oil-soluble paraffin inhibitors include those having oil-soluble polar compounds containing ionic or polar groups, for example amine salts and/or amides, which can be obtained by reaction of aliphatic or aromatic amines, preferably long-chain aliphatic amines, with aliphatic or aromatic mono-, di-, tri- or tetracarboxylic acids or anhydrides thereof. Copolymers, terpolymers and tetrapolymers are also contemplated.

Other oil-soluble paraffin inhibitors include copolymers of maleic anhydride and alpha, beta-unsaturated compounds, which may be reacted with primary monoalkylamines and/or aliphatic alcohols, the products of the reaction of alkenylspirobislactones with amines and products of the reaction of terpolymers based on alpha, beta-unsaturated dicarboxylic anhydrides, alpha, beta-unsaturated compounds and polyoxyalkylene ethers of lower unsaturated alcohols. Alkylphenol-formaldehyde resins are also suitable as oil-soluble paraffin inhibitors.

Preferred oil-soluble paraffin inhibitors include ethylene vinyl acetate copolymers, maleic olefin alkyl esters, acrylate esters, methacrylic esters, and mixtures thereof including homopolymers and copolymers of $C_6$-$C_{24}$ linear esters of acrylic and methacylic acids and $C_{20}$ alpha olefin-maleic copolymers esters of $C_{16}$-$C_{24}$ linear alcohols and $C_{16}$-$C_{28}$ para-substituted phenol formaldehyde resins.

Most preferred are polymeric oil-soluble paraffin inhibitors such as those selected from ethylene/vinyl acetate copolymers, homopolymers and copolymers of acrylate esters, phenol-aldehyde resins, and olefin/maleic esters copolymers.

Most preferred are copolymers of ethylene with at least one vinyl ester of a saturated aliphatic $C_1$ to $C_{24}$ carboxylic acid. See for example, U.S. Pat. No. 3,382,055. In such polymers, different vinyl esters can concurrently be used. Suitable comonomers include vinyl esters of acetic acid, propionic acid, butyric acid, 2-ethylhexane carboxylic acid, pelargonic acid, and stearic acid, particularly $C_2$ to $C_4$ carboxylic acids, and especially vinyl acetate.

A preferred thermoplastic polymer is an ethylene vinyl acetate copolymer wherein the vinyl ester content is from about 10 to about 80 percent, preferably from about 20 to about 45 percent, more preferably from about 25 to about 32 percent, more preferably from about 28 to about 32 percent by weight.

Copolymers having from 3 to 20 molar parts of ethylene per molar part of vinyl acetate, having a molecular weight of 1,000 to 2,900, having a slight degree of branching of the ethylene chains, and may prepared by free radical solution polymerization. The melt viscosity index, ASTM D 1238-6 T (at 190° C. and a load of 2.16 kg), is between 1 and 800 grams per 10 minutes (g/10 min), preferably 5 to 400 g/10 min, more preferably 5 to 150 g/10 min. Commercially available ethylene vinyl acetate copolymers comprising 2 to 45 percent by weight of vinyl acetate and having a melt viscosity index of 6 to 150 g/l 0 min, such as are sold under the name ELVAX®, from E. I. Du Pont de Nemours and Company, may be used.

Exemplary oil-soluble asphaltene inhibitors include, but not limited to, fatty ester homopolymers and copolymers (such as fatty esters of acrylic and methacrylic acid polymers and copolymers) and sorbitan monooleate. Further exemplary asphaltene inhibitors include but are not limited to, basic iron salts of organic acids, mixtures of iron hydroxide and a basic calcium soap, basic and oil-soluble magnesium salts of sulfonic acids, succinimides, optionally in combination with oil-soluble carbonyl manganese compounds and/or a neutral or basic alkali metal salt or alkaline earth metal salt of an organic acid component, as well as alkoxylated fatty amines and fatty amine derivatives, optionally in combination with an organic metal salt.

Exemplary oil-soluble corrosion inhibitors include thiazoles, triazoles and thiadiazoles. Examples of such compounds include benzotriazole, tolyltriazole, octyltriazole, decyltriazole, dodecyltriazole, 2-mercaptobenzothiazole, 2,5-dimercapto-1,3,4-thiadiazole, 2-mercapto-5-hydrocarbylthio-1,3,4-thiadiazoles, 2-mercapto-5-hydrocarbyldithio-1,3,4-thiadiazoles, 2,5-bis(hydrocarbylthio)-1,3,4-thiadiazoles, and 2,5-(bis)hydrocarbyldithio)-1,3,4-thiadiazoles.

Other types of oil-soluble corrosion inhibitors are dimer and trimer acids, such as are produced from tall oil fatty acids, oleic acid, and linoleic acid. Another useful type of corrosion inhibitor for use in the practice of this invention are the alkenyl succinic acid and alkenyl succinic anhydride corrosion inhibitors such as, for example, tetrapropenylsuccinic acid, tetrapropenylsuccinic anhydride, tetradecenylsuccinic acid, tetradecenylsuccinic anhydride, hexadecenylsuccinic acid and hexadecenylsuccinic anhydride. Also useful are the half esters of alkenyl succinic acids having 8 to 24 carbon atoms in the alkenyl group with alcohols such as the polyglycols. Other suitable corrosion inhibitors include aminosuccinic acid derivatives; ether amines; acid phosphates; amines; polyethoxylated compounds such as ethoxylated amines, ethoxylated phenols, and ethoxylated alcohols; imidazolines.

Suitable oil-soluble scale inhibitors include sulfonated acrylate copolymers added to organic solvents, blends of phosphonates (like ATMP, DTPMP etc.) with tertiary amines, like 2-ethyl hexyl amine etc.

The amount of oil-soluble well treatment agent in the dispersion is generally 20 weight percent or greater, more preferably in an amount equal to or greater than 25 weight percent or greater, and more preferably in an amount equal to or greater than 30 weight percent or greater, based on the total weight of the dispersion. Preferably, the oil-soluble well treatment agent in the dispersion is an amount equal to or less than 65 weight percent, more preferably in an amount equal to or less than 60 weight percent, and more preferably in an amount equal to or less than 55 weight percent based on the total weight of the dispersion.

The oil-in-water dispersion typically has a pH of from about 5 to about 13.5, preferably from about 8 to about 13, more preferably from about 10 to about 12.

Typically, the specific gravity of the composite is less than or equal to 3.75 g/cc.

The oil-in-water dispersion, in addition to the oil-soluble well treatment agent may further contain a water-soluble well treatment agent. Thus, instead of introducing two different delivery systems into the well, i.e., one containing the oil-soluble well treatment agent and a second containing the water-soluble well treatment agent, only one delivery system may be required.

When present, the composite may contain between from about 20 to about 50 weight percent of oil-soluble well treatment agent. Where the composite further contains a water-soluble well treatment agent, the amount of water-soluble well treatment agent in the composite is generally about 10 to 15 weight percent. In some instances, the weight ratio of oil-soluble well treatment agent to water-soluble well treatment agent being between from about 10:90 to about 90:10, preferably between from about 35:65 to about 65:35.

In a preferred embodiment, the water-soluble well treatment agent may be a corrosion inhibitor, scale inhibitor, paraffin inhibitor, gas hydrate inhibitor, salt formation inhibitor as well as mixtures thereof. The well treatment agent may thus be used to control and/or prevent the undesired formation of salts, paraffins, gas hydrates, asphaltenes as well as corrosion in formations or on surface equipment.

Further, other suitable water-soluble well treatment agents may be foaming agents, oxygen scavengers, demulsifying agents (both water-in-oil and oil-in-water), hydrogen sulfide, biocides, and surfactants as well as other agents wherein slow release of an inhibitor into a production well is desired.

Suitable well treatment agents as scale inhibitors are anionic.

Preferred well treatment agents include strong acidic materials such as a phosphonic acid, a phosphoric acid or a phosphorous acid, phosphate esters, phosphonate/phosphonic acids, the various aminopoly carboxylic acids, chelating agents, and polymeric inhibitors and salts thereof. Included are organo phosphonates, organo phosphates and phosphate esters as well as the corresponding acids and salts thereof.

Phosphonate/phosphonic acid type well treatment agents are often preferred in light of their effectiveness to control scales at relatively low concentration. Polymeric well treatment agents, such as polyacrylamides, salts of acrylamidomethyl propane sulfonate/acrylic acid copolymer (AMPS/AA), phosphinated maleic copolymer (PHOS/MA) or sodium salt of polymaleic acid/acrylic acid/acrylamidomethyl propane sulfonate terpolymers (PMA/AM PS), are also effective. Sodium salts are preferred.

Further, the scale inhibitor may be an amino trimethylene phosphonic acid (ATMP), 1-hydroxy ethylidene-1,1-diphosphonic acid (HEDP), 2-phosphonobutane-1,2,4-(tricarboxylic acid (PBTC), 2-hydroxyethyl-amino-bis(methylenephosphonic acid (HEAMBP), ethylene diamine tetrakis (methylene phosphonic acid) (EDTMP), tetramethylenediamine-tetrakis-(methylene phosphonic acid) (TDTMP), hexamethylene diamine tetrakis (methylene phosphonic acid) (HDTMP), 2-hydroxy phosphonoacetic acid (HPAA), diethylene triamine penta(methylene phosphonic acid) (DTPMP), bis (hexamethylene triamine penta (methylene phosphonic acid) (BHPMP), polyamino polyether methylene phosphonate (PAPEMP) or a salt thereof; phosphinopolycarboxylate (PPCA), polyacrylate (PAA), polymaleic acid (PMA), an acrylic copolymer, sulfonate polyacrylate co-polymer, polyvinyl sulfonate, carboxymethyl inulin, polyaspartates and mixtures thereof.

Further useful, especially for brines, are chelating agents, including diethylenetriaminepentamethylene phosphonic acid and ethylenediaminetetra-acetic acid.

The well treatment agent may further be a salt inhibitor. Suitable salt inhibitors are those fructans or fructan derivatives, such as inulin and inulin derivatives, as disclosed in U.S. Pat. No. 7,977,283, herein incorporated by reference. Other suitable salt inhibitors include potassium ferrocyanide, nitrilotriacetic acid and nitrilotriacetamide.

Exemplary water-soluble corrosion inhibitors include but are not limited to, fatty imidazolines, alkyl pyridines, alkyl pyridine quaternaries, fatty amine quaternaries and phosphate salts of fatty imidazolines.

Exemplary gas hydrate inhibitors include, but not limited to, polymers and homopolymers and copolymers of vinyl pyrrolidone, vinyl caprolactam and amine based hydrate inhibitors such as those disclosed in U.S. Patent Publication Nos. 2006/0223713 and 2009/0325823, both of which are herein incorporated by reference.

Exemplary demulsifying agents are condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of the such di-functional products. Especially preferred as non-ionic demulsifiers are those prepared from a well treatment agent selected from oxyalkylated phenol formaldehyde resins, oxyalkylated amines and polyamines, di-epoxidized oxyalkylated polyethers, etc. Suitable oil-in-water demulsifiers include poly triethanolamine methyl chloride quaternary, melamine acid colloid, aminomethylated polyacrylamide etc.

Suitable foaming agents are oxyalkylated sulfates or ethoxylated alcohol sulfates, or mixtures thereof.

Exemplary surfactants are cationic, amphoteric, anionic, and nonionic surfactants. Included as cationic members are those containing a quaternary ammonium moiety (such as a linear quaternary amine, a benzyl quaternary amine or a quaternary ammonium halide), a quaternary sulfonium moiety or a quaternary phosphonium moiety or mixtures thereof. Suitable well treatment agents joined with a taggant to form a surfactant include a quaternary group include quaternary ammonium halide or quaternary amine, such as quaternary ammonium chloride or a quaternary ammonium bromide. Included as amphoteric surfactants are those prepared by joining a taggant with glycinates, amphoacetates, propionates, betaines, and mixtures thereof. The cationic or amphoteric surfactant may have a hydrophobic tail (which may be saturated or unsaturated) such as a $C_{12}$-$C_{18}$ carbon chain length. Further, the hydrophobic tail may be obtained from a natural oil from plants such as one or more of coconut oil, rapeseed oil and palm oil.

Preferred surfactants include N,N,N trimethyl-1-octadecammonium chloride: N,N,N trimethyl-1-hexadecammonium chloride; and N,N,N trimethyl-1-soyaammonium chloride, and mixtures thereof. Suitable anionic surfactants are sulfonates (like sodium xylene sulfonate and sodium naphthalene sulfonate), phosphonates, ethoxy sulfates and mixtures thereof.

Exemplary oxygen scavengers are triazines, maleimides, formaldehydes, amines, carboxamides, alkylcarboxyl-azo compounds cumine-peroxide compounds morpholino and amino derivatives morpholine and piperazine derivatives, amine oxides, alkanolamines, aliphatic and aromatic polyamines.

In a preferred embodiment, the surface of the second component may be modified with a primer in order to assist association of the second component with the oil-soluble well treatment agent of the dispersion. The primer may be oil-soluble and/or water-soluble. When used, the primer typically functions as an adherent for the oil-soluble well treatment agent. Further, the primer may be an adherent for the optional water-soluble component of the oil-in-water dispersion. In an embodiment, the primer serves as a glue by keeping the dispersed well treatment agent(s) associated onto the surface of the second component. This may result in slower release of the well treatment agent(s) into the productive zone or within the well. In addition, the lifetime of the composite may be increased due to the slower release of the well treatment agent(s) from the dispersion and into the well. Use of a primer has been proven to be of value in light of the lower average particle size of the oil-soluble well treatment agents defined herein. Further, use of the primer enables higher loadings of such nanoparticles onto the surface of the second component.

While the primer could cover the entire surface of the second component, typically the primer covers no more than 80%, typically no more than 60% and even more typically no more than 35% of the surface of the second component. Since the primer does not completely cover the surface of the second component, a portion of the well treatment agent (such as the oil-soluble well treatment agent) will associate with the portion of the surface of the solid component which does not contain the primer whereas other portions of the oil-soluble well treatment agent will associate with the primer covered surfaces.

In an embodiment, the thickness of the primer applied onto the surface of the second component is no more than 3 μm, typically no more than 1 nm.

Typically, the primer is applied onto the solid particulate prior to introducing the second component to the oil-in-water dispersion. In this manner, the oil-soluble well treatment agent may more readily or easily associate with the second component.

The primer may be an adhesive, such as a resinous adhesive or tackifying resin (such as an oil-soluble resin). The primer may further be a material which provides a reactive functional group for the well treatment agent(s) of the dispersion.

In an embodiment, the second component may be combined with primer in a diluent. The diluent may then be applied onto the surface of the second component. Suitable diluents include alcohols such as methanol, ethanol or propanol; aliphatic hydrocarbons such as hexane, isooctane and decane, ethers, for example, tetrahydrofuran and dialkylethers such as diethylether. Aqueous alkaline solutions such as sodium and potassium hydroxide can be used as the diluent.

The primer may be applied to the surface of the second component by conventional means such as immersion coating like dipping, rolling, spraying or wiping and then permitting partial drying. This can be accomplished by heating the primer and second component to a temperature between from 50 to about 350° C. The coated second component may then be cooled to room temperature.

In another embodiment, association of the dispersed well treatment agent with the second component may be assisted by modifying the surface of the second component with a coating of a resin, resin adhesive or tackifying resin, preferably an oil or water soluble resin or tackifying resin. The coating layer may be applied to the shaped composite by mixing the shaped composite and coating material in a vessel at elevated temperatures, typically from about 200 to about 350, preferably around 250° F. Suitable materials include, but are not limited to, polyvinyl alcohol, polyvinyl pyrrolidone, ethylene vinyl acetate copolymer, acrylic acid polymers, acrylic acid ester polymers, acrylic acid derivative polymers, acrylic acid homopolymers, acrylic acid ester homopolymers (such as poly(methyl acrylate), poly (butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacryate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers and combinations thereof.

In some embodiments, it may be advantageous to provide a coating to the surface of the second component which is resistant to the hydrocarbons produced in the well. Suitable resins include phenolic resins like phenol formaldehyde resins, melamine formaldehyde resins, urethane resins, epoxy resins, polyamides, such as nylon, polyethylene, polystyrene, furan resins or a combination thereof.

In another embodiment, the primer may be an organometallic compound. In some embodiments, the organometallic may be used to impart reactive functional groups to the surface of the second component. Such functional groups may more readily associate, for example, the oil-soluble well treatment agent in the dispersion to the surface of the second component.

Suitable organometallic compounds may include those derived from a transition metal, such as a Group IIIB metal or a transition metal selected from Group IVB, VB and VIB. Preferred transition metals are titanium, zirconium, lanthanum, hafnium, tantalum and tungsten.

The organo portion of the organometallic may contain an alkoxide and/or halides. Examples of suitable alkoxide groups are those containing from 1 to 18 carbon atoms, preferably 2 to 8 carbon atoms, such as ethoxide, propoxide, isopropoxide, butoxide, isobutoxide and tertiary butoxide. Examples of suitable halides are fluoride and chloride. Other ligands which may also be present are acetyl acetonates.

Suitable organometallic compounds may be esters and polymeric forms of the esters including:
  i. alkoxylates of titanium and zirconium having the general formula $M(OR)_4$, wherein M is selected from Ti and Zr and R is $C_{1-18}$ alkyl;
  ii. alkyl esters of titanium and zirconium having the general formula $(X)_{4-y}\text{-}M(OR)_y$, wherein M is selected from Ti and Zr; X is selected from fluorine and chlorine; R is $C_{1-18}$ alkyl and y=2 to 3;
  iii. polymeric alkyl titanates and zirconates obtainable by condensation of the alkyl esters of (a), i.e., partially hydrolyzed alkyl esters of the general formula RO[-M(OR)(X)O—]$_y$R, wherein M, R and X are as above and y is a positive integer,
  iv. titanium chelates, derived from ortho titanic acid and polyfunctional alcohols containing one or more additional hydroxyl, halo, keto, carboxyl or amino groups capable of donating electrons to titanium. Examples of these chelates are those having the general formula $Ti(O)_a(OH)_b(OR')_c(XY)_d$, wherein a=4−b−c−d; b=4−a−c−d; c=4−a−b−d; d=4−a−b−c; R' is H, R as above or X-Y, wherein X is an electron donating group such as oxygen or nitrogen and Y is an aliphatic radical having a two or three carbon atom chain such as:
(a) —CH$_2$CH$_2$—, e.g., of ethanolamine, diethanolamine and triethanolamine, or

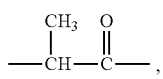

(b) lactic acid,

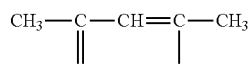

(c) acetylacetone enol form, and

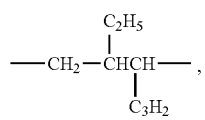

(d) 1,3-octyleneglycol,
v. titanium acrylates having the general formula Ti(OCOR)$_{4-n}$(OR)$_n$ wherein R is C$_{1-18}$ alkyl as above and n is an integer of from 1 to 3, and polymeric forms thereof, or
vi. mixtures of (a) and (b).

The organometallic compound is usually dissolved or dispersed in a diluent. Examples of suitable diluents are alcohols such as methanol, ethanol and propanol, aliphatic hydrocarbons, such as hexane, isooctane and decane, ethers, for example, tetrahydrofuran and dialkyl ethers such as diethyl ether. Alternatively, the organometallic compound may be applied to the solid particulate by vapor deposition techniques.

In an embodiment, the oil-soluble well treatment agent in the dispersion may be absorbed onto or absorbed onto a surface of the second component. In an embodiment, the oil-soluble well treatment agent of the dispersion may be absorbed into a matrix of the second component. In another embodiment, the oil-soluble well treatment agent of the dispersion may be adsorbed or absorbed onto or into the pores of the second component.

In some cases, it may be desirable for a well treatment agent to be associated with the second component prior to bringing the second component into contact with the oil-in-water dispersion containing the oil-soluble well treatment agent (and optional water-soluble well treatment agent). In such instances, the well treatment agent associated with the second component prior to bringing the second component into contact with the dispersion may be referred to as a supplemental well treatment agent. The supplemental well treatment agent may be an oil-soluble well treatment agent and/or water-soluble well treatment agent. In some cases, the supplemental well treatment agent may be the same or different from the oil-soluble well treatment agent and/or water-soluble well treatment agent in the aqueous dispersion. Exemplary of such supplemental well treatment agents may be any of the agents referenced in the paragraphs above.

In a preferred embodiment, the oil-soluble well treatment agent of the oil-in-water dispersion is absorbed onto or absorbed onto a surface of the second component. In such instances, the second solid component may a water-insoluble adsorbent. The dispersion containing the oil-soluble well treatment agent may be mixed with the adsorbent until the well treatment agent is readily adsorbed and/or absorbed. The mixture may then be dried at elevated temperatures, typically between from about 200° F. and 250° F. Typically, the moisture content of the resulting product is less than 5% by weight. At least a portion of the oil-soluble well treatment agent may further be absorbed into interstitial spaces of the support. The oil-soluble well treatment agent is then slowly released from the adsorbent after the composite is introduced into the well and/or formation and when hydrocarbon is flowing through the reservoir. The controlled slow release of the well treatment agent may be dependent upon the surface charges between the well treatment agent and support which, in turn, may be dependent on the adsorption/desorption properties of the well treatment agent to adsorbent, pH variations, salinity, hydrocarbon composition, temperature, and pressure.

The water-insoluble adsorbent may be of various kinds of commercially available high surface area materials having the affinity to adsorb the desired well treatment agent. Typically, the surface area of the adsorbent of the composite is between from about 1 m$^2$/g to about 100 m$^2$/g.

Suitable adsorbents include finely divided minerals, fibers, ground almond shells, ground walnut shells, and ground coconut shells. Further suitable water-insoluble adsorbents include activated carbon and/or coals, silica particulates, precipitated silicas, silica (quartz sand), alumina, silica-alumina such as silica gel, mica, silicate, e.g., orthosilicates or metasilicates, calcium silicate, sand (e.g., 20-40 mesh), bauxite, kaolin, talc, zirconia, boron and glass, including glass microspheres or beads, fly ash, zeolites, diatomaceous earth, pumice, ground walnut shells, fuller's earth and organic synthetic high molecular weight water-insoluble adsorbents. Particularly preferred are diatomaceous earth and ground walnut shells.

Further useful as adsorbents are clays such as natural clays, preferably those having a relatively large negatively charged surface, and a much smaller surface that is positively charged. Other examples of such high surface area materials include such clays as bentonite, illite, montmorillonite and synthetic clays.

The composite has limited solubility in water and hydrocarbons. When placed into a production well, the well treatment agent slowly dissolves at a generally constant rate over an extended period of time in the water or oil which is contained in the formation. The controlled slow release of the well treatment agent is dependent upon the surface charges between it and the adsorbent which, in turn, is dependent upon the adsorption, absorption, and desorption properties of the well treatment agent to adsorbent.

The composite may contain, in addition to the oil-soluble well treatment agent, a water-soluble treatment agent. Suitable methods of preparing water-soluble well treatment agents adsorbed and/or absorbed onto a support, such as a water-insoluble adsorbent, are disclosed in U.S. Pat. Nos. 7,491,682; 7,493,955; 7,977,283; and 8,664,168, all of which are herein incorporated by reference.

Where the composite contains both an oil-soluble well treatment agent and a water-soluble well treatment agent, the water-soluble well treatment agent is first adsorbed and/or absorbed onto or into the adsorbent. After the water-soluble well treatment agent has been adsorbed and/or absorbed onto the support, the resulting composite may be mixed with the oil-soluble well treatment agent until the oil-soluble well treatment agent is readily adsorbed and/or absorbed into the adsorbent. The oil-soluble and water-soluble treatment agents may then be dried at elevated temperatures as stated above. Typically, the moisture content of the resulting product is less than 5% by weight.

The weight ratio of the oil-soluble well treatment agent to water-insoluble adsorbent in the composite is generally between from about 90:10 to about 10:90.

In an embodiment, the oil-in-water dispersion may be associated with a porous particulate as the solid second component. In such instances, the particle size of the porous particulate is between from about 0.3 mm to about 5 mm, preferably between from about 0.4 to about 2 mm. The porosity and permeability of the porous particulate is such that the oil-soluble well treatment agent may be absorbed into the pores of the porous particulate material. Typically, the porosity of the porous particulate is between from about 5 to about 30 volume percent. A commercially available instrument which uses mercury intrusion, such as the Auto-Pore Mercury Porosimeter (Micromeritics, Norcross, GA), for measuring the internal porosity of the particulate and the interstitial volume (of a pack) may be used to determine the porosity of the porous particulate. Generally, the amount of oil-soluble well treatment agent in the composite is from about 0.05 to about 30 (preferably from about 0.1 to about 15) weight percent based upon the total weight of the composite.

Examples of types of materials suitable for use as porous particulates include particulates having a porous matrix. The porous particulates are generally spherical and insoluble in well fluids under subterranean conditions, such as at temperatures less than about 250° C. and pressures less than about 80 MPa. Since the tagged well treatment agents employed in the composites are capable of being absorbed into the interstitial spaces of the porous particulates, they may be slowly released from the porous particulates into produced fluids. Produced fluids may therefore be exposed to a continuous supply of well treatment agent.

Suitable as porous particulates are those particulates set forth in U.S. Pat. Nos. 5,964,291 and 7,598,209, herein incorporated by reference. For instance, the porous particulate of the composite may be any naturally occurring or manufactured or engineered porous ceramic particulate, as well as any organic polymeric material, that has an inherent and/or induced porosity. Such porous particulates may exhibit the requisite physical properties, such as particle characteristics, desired strength and/or apparent density, to fit particular downhole conditions, including those common in hydraulic fracturing and sand control operations.

Suitable as inorganic ceramic materials are alumina, magnetic glass, titanium oxide, zirconium oxide, silicon carbide, aluminosilicates, and other silica-based materials. Examples of non-natural porous particulate materials include, but are not limited to, porous ceramic particles, such as fired kaolinitic particles, as well as partially sintered bauxite. The porous particulates may further be porous natural ceramic materials, such as lightweight volcanic rocks, like pumice, as well as perlite and other porous "lavas" like porous (vesicular) Hawaiian Basalt, porous Virginia Diabase and Utah Rhyolite. Such naturally occurring materials may be strengthened or hardened by use of modifying agents to increase the ability of the naturally occurring material to resist deformation. A starch binder may be employed.

Suitable polymeric materials for use as the porous particulate include thermosetting resins, such as polystyrene, a styrene-divinylbenzene copolymer, a polyacrylate, a polyalkylacrylate, a polyacrylate ester, a polyalkyl acrylate ester, a modified starch, a polyepoxide, a polyurethane, a polyisocyanate, a phenol formaldehyde resin, a furan resin, or a melamine formaldehyde resin.

The composites may be prepared by conventional processes, such as electrofusion, spray-drying and pelletization. In a preferred embodiment, the composites are prepared by contacting the porous particulate with the oil-in-water dispersion for a period of time for the porous particulate to be saturated. The porous particulates are then dried and the oil-soluble well treatment agent is then imbibed within the porous particulate.

In another embodiment, the second solid component may be a calcined metal oxide. In such instances, the oil-soluble well treatment agent may be adsorbed onto a nano-sized calcined porous substrate of high surface area.

The porous substrate may be a metal oxide, such as alumina, zirconium oxide and titanium oxide. Typically, the porous substrate is alumina. The adsorbent may be prepared as set forth in U.S. Pat. No. 9,029,300, herein incorporated by reference. In an embodiment, the porous substrate is alumina having an average diameter in the range from about 0.4 mm to about 1 mm.

In some instances, the calcined metal oxide may be a zeolite, molecular sieves (crystalline metal aluminosilicates exhibiting a three-dimensional network of silica and alumina tetrahedra), metal-organic frameworks and other synthetic high porous materials such as nanoporous, mesoporous (pore size 2-50 nm) and microporous (pore size>50 nm) including synthetic mesoporous silica, aluminosilicates and carbon compounds. In such instances, the surface area of the second solid component may be from 10 $m^2$/g to over 1,000 $m^2$/g.

The porosity and permeability of the calcined porous substrate is such that the oil-soluble well treatment agent may be absorbed into the interstitial spaces of the porous substrate. In some instances, the surface area of the calcined porous substrate may be between from about 1 $m^2$/g to about 10 $m^2$/g; in other instances between from about 1.5 $m^2$/g to about 4 $m^2$/g.

The diameter of the calcined porous substrate is between from about 0.1 to about 3 mm, preferably between from about 150 to about 1780 micrometers, and the pore volume of the calcined porous substrate is between from about 0.01 to about 0.10 g/cc. The porous metal oxide is typically spherical and insoluble in well fluids under subterranean conditions, such as at temperatures less than about 250° C. and pressures less than about 130 MPa.

The oil-in-water dispersion containing the oil-soluble treatment agent may be mixed with the adsorbent until the oil-soluble well treatment agent is readily adsorbed and/or absorbed into the adsorbent. The mixture may then be dried at elevated temperatures (typically between from about 220° C. to about 250° C.) until the moisture content is about 3% by weight.

In another embodiment, the second solid component be a solid matrix or binder and the oil-soluble well treatment agent of the oil-in-water dispersion may be immobilized in the matrix or binder. In a preferred embodiment, the dispersion is mixed with a binder (the second component) and the mixture then dried. The mixture may then compressed into a shaped article.

Suitable binders may be an organic binder or inorganic binder. Typical organic binders are those selected from resole or novolac resins, such as phenolic resole or novolac resins, epoxy-modified novolac resins, epoxy resins, polyurethane resins, alkaline modified phenolic resoles curable with an ester, melamine resins, urea-aldehyde resins, ureaphenol-aldehyde resins, furans, synthetic rubbers, silanes, siloxanes, polyisocyanates, polyepoxys, polymethylmethacrylates, methyl celluloses, crosslink entangled polystyrene divinylbenzenes, and plastics of such polymers as polyesters, polyamides, polyimides, polyethylenes, polypropylenes, polystyrenes, polyolefins, polyvinyl alcohols, polyvinylacetates, silyl-modified polyamides and, optionally, a crosslinking agent. Typical inorganic binders include silicates, e.g., sodium silicate, aluminosilicates, phosphates, e.g., polyphosphate glass, borates, or mixtures thereof, e.g., silicate and phosphate.

The amount of binder added to the oil-soluble well treatment agent and, optionally, the water-soluble well treatment agent, to form the shaped compressed composite is typically from about 0.5 to about 50, preferably from about 1 to about 5, percent based on the total weight of the binder and well treatment agent prior to compression.

Suitable methods for making the compressed article are set forth in U.S. Pat. Nos. 7,493,955 and 7,494,711 and U.S. Patent Publication No. 2012/0012326, herein incorporated by reference. In such methods, the dried mixture and binder is compressed at a temperature between from about 20° C. to about 50° C. at a pressure of from between 50 to about 5000 psi. The hardened particulates may then be screened to the desired size and shape.

In another preferred embodiment, the shaped composites may be produced by a continuous extrusion at a temperature between from about 400° C. to about and 1500° C.

Further, the mixture, subjected to compression, may contain a weighting agent.

The shaped composites may further be coated with a resin, plastic or sealant which is resistant to the hydrocarbons produced in the well. Suitable resins include phenolic resins like phenol formaldehyde resins, melamine formaldehyde resins, urethane resins, epoxy resins, polyamides, such as nylon, polyethylene, polystyrene, furan resins or a combination thereof.

The coating layer serves to strengthen the compressed composite, protect the shaped composite from harsh environmental conditions, protect the shaped composite from rupturing as it is lowered into the well and to lengthen the time of release of the tagged well treatment agent from the shaped compressed composite. The coating layer may be applied to the shaped composite by mixing the shaped composite and coating material in a vessel at elevated temperatures, typically from about 200 to about 350, preferably around 250° F. An adherent, such as a resin adhesive or tackifying resin, may further be added to the vessel during mixing. The adherent may be used to assist the adhesion of the coating onto the compressed composite. Alternatively, the coating layer may also be applied as a spray in a solvent based coating on the shaped compressed composite and then dried to remove the solvent.

The shaped compressed pellet may be carried into a zone of interest. The oil-soluble well treatment agent(s) and water-soluble well treatment agent(s) may slowly be released from the shaped compressed composite after being introduced into a targeted area in the well. The shaped compressed composite provides a continuous supply of the well treatment agent into the targeted area.

The shaped compressed composite is preferably a pellet and may be in the form of a sphere, cylinder, rod, or any other shape which allows for the slow release of the taggant into the targeted area. In some applications, the shaped compressed composite is cylindrically shaped having a length of about 0.5 inch to about 6 inches, preferably from about 1 inch to about 2 inches and a diameter of from about 0.25 inch to about 4 inches, preferably from about 0.5 inch to about 1 inch. The specific gravity of the shaped compressed composite is generally between from about 1.1 to about 3. In a preferred embodiment, the specific gravity of the shaped compressed composite is between from about 2 to about 2.5.

The composite may contain, in addition to the oil-soluble well treatment agent, a water-soluble treatment agent. Suitable methods of preparing water-soluble well treatment agents adsorbed and/or absorbed onto the support are disclosed in U.S. Pat. No. 9,029,300. After the water-soluble well treatment agent has been adsorbed and/or absorbed onto the support, the resulting composite may be mixed with the oil-in-water dispersion containing the oil-soluble well treatment agent until the oil-soluble well treatment agent is readily adsorbed and/or absorbed into the adsorbent. The mixture may then be dried at elevated temperatures as stated above. Typically, the moisture content of the resulting product is less than 5% by weight.

Generally, the amount of oil-soluble well treatment agent in the composite may be from about 20% to about 30% by weight. Where the composite contains both oil-soluble well treatment agents, the amount of water-soluble well treatment agent in the composite is from about 0.05 to about 5 (preferably from about 0.1 to about 2) weight percent based upon the total weight of the composite; the weight ratio of oil-soluble well treatment agent to water-soluble well treatment agent being between rom about 10:90 to about 90:10, preferably between from about 35:65 to about 65:35.

The composite containing the well treatment agent is carried into the well and/or formation in a water-based or oil-based carrier fluid. Water-based carrier fluids include fresh water and brine. Oil-based carrier fluids include liquid hydrocarbons such as diesel, kerosene, jet fuel, crude oil, and condensate as well as synthetic fluids like esters, linear α-olefins, poly-α-olefins, internal olefins, paraffins, linear alkyl benzenes, esters, and acetals.

In addition, the carrier fluid may be a gas such as nitrogen or carbon dioxide.

In one embodiment, the composite may be introduced or pumped into a well as neutrally buoyant particles in the carrier fluid.

The fluid may be gelled or non-gelled. The fluid may further include gelling agents, cross-linking agents, gel breakers or mixtures thereof.

As fluid passes through or circulates around the composites, the well treatment agent slowly dissolves over a generally constant rate over an extended period of time in the water or hydrocarbons which are contained in the formation and/or well. The well treatment agent may be released from the composite into a solubilizing fluid within the formation or the well. For example, water-soluble well treatment agents may remain intact on calcined porous metal oxide in the absence of water flow and slowly released in the presence of water. Hydrocarbon soluble well treatment agents may remain intact in the composite until they are slowly desorbed into the hydrocarbon phase of produced fluid. Thus, the composites are characterized by time-release capabilities of the well treatment agents which permit a continuous supply of the well treatment agent into the fluid in the well.

Generally, the lifetime of the composite of a single treatment after it is introduced into the formation is 18 months or greater; in some cases, nine months or greater and in other cases six months or greater depending upon the volume of fluid produced in the production well and the amount of well treatment agent in the composite. Gradual dissolution of the well treatment agent ensures that they are available to produced fluids for extended periods of time. Such small amounts of well treatment agents may be sufficient for up to 1,000 pore volumes. Costs of operation are therefore significantly lowered.

The composite defined by the oil-in-water dispersion and solid second component may be introduced into the well in a squeeze treatment or may be introduced during a hydraulic fracturing, matrix acidizing or fracturing acidizing operation. Typically, the composite is introduced into the well as a component of a stimulation fluid such as a fracturing fluid or acidizing fluid (as an example, an acid fracturing fluid or a matrix acidizing fluid).

The composite has particular applicability in completion fluids containing zinc bromide, calcium bromide calcium chloride and sodium bromide brines. Such fluids may be introduced down the annulus of the well and, when desired, flushed with produced water.

The composites of the invention are particularly effective in hydraulic fracturing (including re-fracturing) as well as sand control fluids such as water, salt brine, slickwater such as slick water fracture treatments at relatively low concentrations to achieve partial monolayer fractures, low concentration polymer gel fluids (linear or crosslinked), foams (with gas) fluid, liquid gas such as liquid carbon dioxide fracture treatments for deeper proppant penetration, treatments for water sensitive zones, and treatments for gas storage wells.

When used in hydraulic fracturing, the composite may be injected into a subterranean formation in conjunction with a hydraulic fracturing fluid at pressures sufficiently high enough to cause the formation or enlargement of fractures. Since the particulates may withstand temperatures greater than about 370° C. and closure stresses greater than about 8000 psi, they may be employed as the proppant particulate. Alternatively, the composite may be employed in conjunction with a conventional proppant. Since the porous particulate of the composite is insoluble, the composite may continue to function as a proppant even after the well treatment agent has been completely leached out of the composite.

Fluids containing the well treatment composites may be used to optimize hydraulic fracture geometries and enhance well productivity. As an example, the fluids may be used to achieve increased propped fracture length in relatively tight gas formations. Choice of different particulate materials and amounts thereof to employ in such blends may be made based on one or more well treatment considerations including, but not limited to, objective/s of well treatment, such as for sand control and/or for creation of propped fractures, well treatment fluid characteristics, such as apparent specific gravity and/or rheology of carrier fluid, well and formation conditions such as depth of formation, formation porosity/permeability, formation closure stress, type of optimization desired for geometry of downhole-placed particulates such as optimized fracture pack propped length, optimized sand control pack height, optimized fracture pack and/or sand control pack conductivity and combinations thereof. The fracturing fluid, to be used with the composite, exhibits high viscosity, so as to be capable of carrying effective volumes of one or more proppants. It may include aqueous gels and hydrocarbon gels.

The composite may further be advantageously employed in liquefied gas and foamed gas carrier fluids, such as liquid $CO_2$, $CO_2/N_2$, and foamed $N_2$ in $CO_2$ based systems. In this regard, liquid $CO_2$ based fracturing job characteristics, such as proppant amounts, proppant sizes, mixing and pumping methodologies, using relatively lightweight porous ceramic materials may be the same as employed for conventional proppants.

Further, a gravel pack operation may be carried out on a wellbore that penetrates a subterranean formation to prevent or substantially reduce the production of formation particles into the wellbore from the formation during production of formation fluids. The subterranean formation may be completed so as to be in communication with the interior of the wellbore by any suitable method known in the art, for example by perforations in a cased wellbore, and/or by an open hole section. A screen assembly such as is known in the art may be placed or otherwise disposed within the wellbore so that at least a portion of the screen assembly is disposed adjacent the subterranean formation. A slurry including the composite and a carrier fluid may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore. It is possible that the slurry may contain all or only a portion of the composite; the balance of the slurry may be another material, such as a conventional gravel pack particulate.

As an alternative to use of a screen, the composite may be used in any method in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel pack screen, may be introduced into a wellbore at pressures below, at or above the fracturing pressure of the formation, such as frac pack, and/or may be employed in conjunction with resins such as sand consolidation resins if so desired. In this procedure, an initial charge of the composite may be injected into the well bore in a conventional method, whether for fracturing or for gravel packing. Such conventional methods include truck treating, continuous injection, or high pressure pumping, for example. The downhole matrix formed within the formation after the initial charge is comprised of the composite as part of the sand matrix.

Additional amount of fluid containing the composite may be injected into the formation any time after the initial charge of well treatment agent in the composite has at least partially depleted. Typically, the additional well treatment agent is introduced when the well treatment agent has been substantially depleted and the performance level of the well treatment agent in the composite has become unacceptable.

The injection of additional well treatment agent may be carried out in the same manner by which the initial composite was charged into the wellbore, and can be carried out in any conventional method of injecting fluids into a wellbore of an oil or gas well, as mentioned above. The fluid which is injected will typically be comprised of the desired well treatment agent(s) in a solution which further comprises a solvent. The relative amounts of the solvent and treatment agent of the solution to be injected into the wellbore will of course vary depending upon the agent and solvent involved, but will typically be of a solvent to treatment agent ratio in the range of about 10:90 to about 95:5, by weight. After the injection step is carried out, the wellbore is pressurized for a time and under conditions sufficient to reactivate the downhole matrix in the formation. Reactivation of the treatment agent downhole may occur through the squeeze process as long as the activity of the treatment agent in the in-place matrix is increased relative to the treatment agent activity of the matrix just prior to injecting the solution. The determination of whether the treatment agent activity has increased relative to the activity of that agent just prior to injection of the solution and completion of the squeeze may be made through conventional residual analysis and comparison of the same before and after the squeeze, and conventional analysis of the physical well parameters, e.g., the production rate of the well and well pressure.

The pressure to which the wellbore is pressurized in the squeeze process typically will be a pressure below the fracturing pressure, and when applicable, below the pressure that would cause the gravel pack to break up. In one embodiment of the invention, the pressure is in a range of about 500 to about 15000 psia. The duration for which the pressure condition is applied to the well will vary, depending upon the ease of fracturing, but will typically be in the range of about 2 to about 10 hours.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

EXAMPLES

All percentages set forth in the Examples are given in terms of weight units except as may otherwise be indicated.

WD D refers to an aqueous paraffin inhibitor dispersion (commercially available from the Dow Chemical Company as Accent® 1311. The solids content of the aqueous dispersions is between about 25 and about 52 weight percent; the pH of the dispersion is between about 11.0 and about 11.5; the average volume diameter of the dispersed polymer particulates in the dispersion is between about 0.40 to about 0.43 micrometers (measured by a Coulter LS 13 320 particle analyzer); and the particle size distribution (Dv/Dn) is between about 1.10 and about 1.20. The ethylene vinyl acetate copolymer of the aqueous dispersions generally contained 25-52 weight percent vinyl acetate and is commercially available as ELVAX® 150. The polymer exhibits a density of about 0.94 to about 0.96 g/cc (ASTM D-792), a melt index of about 43 g/10 minutes (ASTM D1238 at 190° C. and 2.16 kg), and a DSC melting point from about 60° C. to about 75° C. (ASTM 3418).

HC A refers to a paraffin dispersion containing about 12 weight percent of ELVAX® 150 ethylene vinyl acetate copolymer in a hydrocarbon solvent (xylene, mineral oil etc.).

Example 1. The viscosity of HC A and WD D were measured on an OFITE M900 viscometer, available from the OFI Testing Equipment, Inc., using a R1B1 rotor-bob configuration @ 511 sec$^{-1}$. A sample of the fluid was poured into an OFITE sample cup and sheared at 511 sec$^{-1}$ for 1 min. and a reading was noted. The viscosity of the HC A was greater than 122,000 cP (at 80° F.) and the viscosity of the WD D aqueous dispersion was 21 cP (at 80° F.). Composites disclosed herein using aqueous dispersions thus can have a higher loading of oil-soluble paraffin inhibitors versus those composites prepared from hydrocarbon based solvents. As such, aqueous treatment fluids contain a higher loading of oil-soluble paraffin inhibitor when the composites are prepared from aqueous based dispersions versus composites prepared from hydrocarbon based inhibitor solutions.

Example 2. A composite containing an oil-soluble paraffinic inhibitor was prepared as follows. About 800 g of 10/50 diatomaceous earth (Celite MP-79 or MP-80) adsorbent was added into a mixing bowl. A paddle mixer blade to agitate the sample was attached and WD D was added to the mixing bowl at a rate in which the liquid readily adsorbed and puddle formation was voided. After completion of addition of the aqueous dispersion, mixing was continued until a homogenous blend was produced. The blend was then dried at 225° F. until the moisture content of the product was less than 5%. The composite prepared contained approximately 24 to 27 percent by weight of ethylene vinyl acetate copolymer paraffin inhibitor.

Example 3. A composite was prepared by adding about 800 g of 10/50 mesh diatomaceous earth (Celite MP-79 or MP-80) absorbent into a mixing bowl. A paddle mixer blade was attached and an oil-soluble liquid containing about 12% ELVAX® 150 was added to the mixing bowl at a rate in which the oil dispersion was absorbed. The composite thus prepared contained about 10 to about 12 percent by weight active ethylene vinyl acetate copolymer.

Example 4. The elution characteristics of the composite of Example 2 was compared to the elution characteristics of an aqueous fluid containing the composite of Example 3. To a 13⅞" long stainless-steel column (inner diameter of ½") was packed 45 g of 20/40 Ottawa sand with 1% loading (by wt. of Ottawa sand) of the composite of Example 2. The pore volume of the column was 12 cc. The column was placed in a water bath at the desired temperature and a paraffinic crude oil (kept at that same temperature) was flowed through the column at the rate of 2 cc/min.

100 mL aliquots of the treated oil were collected and pour point and cold finger testing for deposit analysis was run. This determined the best chemical for reducing the amount of paraffin deposition on the cold finger probes. The oil was initially heated to 180° F. and transferred to a cold finger chamber where the oil was heated to 5° F. above the cloud point while the cold finger probe was cooled to 20° F. below the cloud point. The amount of deposits collected on the probe was weighed to indicate the extent of paraffin deposition when the oil was cooled. As illustrated in the FIGURE, the composite of Example 2 resulted in lower deposits for a longer period of time (the base line being the base oil fluid containing no inhibitor) compared to the composite of Example 3. The composite of Example 2 resulted in lower oil deposits lasting more than 200 pore volumes while the composite of Example 3 lasted only about 150 pore volumes.

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form, and configuration of components.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A method of treating a well or a subterranean formation penetrated by a well which comprises pumping into the well an aqueous treatment fluid having a composite comprising at least one oil-soluble well treatment agent as a first component associated with a second component, wherein the second component is either a water-insoluble adsorbent or a calcined metal oxide and wherein a primer is attached to at least a portion of a surface of the second component, the composite prepared by contacting the second component with an oil-in-water dispersion having the oil-soluble well treatment agent as the dispersed phase and further wherein the primer slows release of the well treatment agent into a productive zone of the subterranean formation or within the well after the composite is pumped into the well.

2. The method of claim 1, wherein the composite further comprises at least one water-soluble well treatment agent.

3. The method of claim 2, wherein the composite is prepared by contacting the second component having the primer attached thereto with the oil-in-water dispersion, the oil-in-water dispersion further comprising the at least one water-soluble well treatment agent.

4. The method of claim 3, wherein the water-soluble well treatment agent is present in the dispersion in an amount between about 0.01 to about 12 weight percent.

5. The method of claim 1, wherein the dispersion further comprises a dispersing agent.

6. The method of claim 1, wherein at least one of the following is true:
   (a) the oil-soluble treatment agent has a particle size distribution in the dispersion which is equal to or less than 2.5;
   (b) the oil-soluble well treatment agent has an average particle size in the dispersion from about 0.005 to about 2 micrometers;
   (c) the dispersion has an average particle size less than or equal to 1 micrometers; or
   (d) the oil-soluble well treatment agent has a volume average particle size in the dispersion from about 2 to about 5 microns.

7. The method of claim 1, wherein the primer is oil soluble, water soluble or both oil soluble and water soluble.

8. The method of claim 1, wherein at least one of the following is true:
   (a) the oil-soluble well treatment agent is present in the composite in an amount between from about 20 to about 50 weight percent;
   (b) the oil-soluble well treatment agent in the composite has an average particle size which is less than or equal to 1 micrometer; or
   (c) the primer adhered onto the surface of the second component has a thickness no more than 3 μm.

9. The method of claim 1, wherein the primer is a resinous adhesive or a tackifying resin.

10. The method of claim 9, wherein the primer is selected from the group consisting of polyvinyl alcohol, polyvinyl pyrrolidone, ethylene vinyl acetate copolymer, acrylic acid polymers, acrylic acid ester polymers, acrylic acid derivative polymers, acrylic acid homopolymers, acrylic acid ester homopolymers, acrylic acid ester co-polymers, methacrylic acid derivative polymers, methacrylic acid homopolymers, methacrylic acid ester homopolymers, acrylamido-methyl-propane sulfonate polymers, acrylamido-methyl-propane sulfonate derivative polymers, acrylamido-methyl-propane sulfonate co-polymers, phenol formaldehyde resins, melamine formaldehyde resins, urethane resins, epoxy resins, polyamides, polyethylene, polystyrene, furan resins, and acrylic acid/acrylamido-methyl-propane sulfonate co-polymers and combinations thereof.

11. The method of claim 9, wherein the primer is an organometallic compound.

12. The method of claim 1, wherein the primer provides a reactive functional group for the oil-soluble well treatment agent of the dispersion.

13. The method of claim 1, wherein the composite further comprises at least one water-soluble well treatment agent selected from the group consisting of paraffin inhibitors, scale inhibitors, corrosion inhibitors, salt inhibitors, biocides and mixtures thereof.

14. The method of claim 1, wherein the aqueous treatment fluid is:
   (a) a fracturing fluid and wherein the fracturing fluid is pumped into the well at a pressure sufficient to create or enlarge a fracture within the subterranean formation;
   (b) a completion fluid;
   (c) an acidizing fluid;
   (d) pumped into the well in an enhanced oil recovery operation; or
   (e) pumped into the well in a sand control operation.

15. A method of treating a well or a subterranean formation penetrated by a well which comprises:
   (a) pumping into the well an oil-insoluble, water-insoluble well treatment composite comprising, as a first component, at least one oil-soluble well treatment agent immobilized by or within a second component wherein a primer coats a surface of the second component and further wherein at least a portion of the at least one oil-soluble well treatment agent is adhered onto the primer and further wherein the composite is prepared by contacting the second component having the primer with an aqueous dispersion composition containing a dispersant and an oil-in-water dispersion having the at least one oil-soluble well treatment agent as the oil phase wherein (i) the at least one oil-soluble well treatment agent is selected from the group consisting of paraffin inhibitors, corrosion inhibitors, asphaltene inhibitors, scale inhibitors and mixtures thereof; and (ii) the second component having the primer is a water-insoluble adsorbent or a calcined metal oxide; and
   (b) solubilizing the at least one oil-soluble well treatment agent into produced fluid or hydrocarbons in the subterranean formation wherein the primer on the second component slows release of the at least one oil-soluble well treatment agent into a productive zone of the subterranean formation or within the well after the composite is pumped into the well.

16. The method of claim 15, wherein the composite further comprises at least one water-soluble well treatment agent and wherein a portion of the water-soluble well treatment agent is adhered onto the surface of the portion of the second component covered by the primer and another portion of the water-soluble well treatment agent is adhered onto a portion of the second component which is not covered by the primer.

17. A method of treating a well or a subterranean formation penetrated by a well which comprises pumping into the well an aqueous treatment fluid having a composite comprising at least one oil-soluble well treatment agent as a first component associated with a second component, wherein the second component is a water-insoluble adsorbent or a calcined metal oxide and wherein a primer is adhered to a portion of a surface of the second component such that a portion of the oil-soluble well treatment agent is associated with the second component which does not have the primer and a portion of the oil-soluble well treatment agent is associated with the primer and further wherein the primer slows release of the well treatment agent into a productive zone of the subterranean formation or within the well after the composite is pumped into the well, and further wherein at least one of the following is true:
- (1) the composite is prepared by contacting the second component having the primer adhered thereto with an aqueous dispersion composition, the aqueous dispersion comprising (i) the at least one oil-soluble well treatment agent dispersed in water; and (ii) a dispersing agent; or
- (2) the composite further comprises at least one water-soluble well treatment agent and wherein a portion of the water-soluble well treatment agent is associated with the second component which does not have the primer and a portion of the water-soluble well treatment is associated with the primer and either:
  - (i) the composite is prepared by contacting the second component having the primer adhered thereto with an aqueous dispersion composition, the aqueous dispersion comprising (i) the at least one oil-soluble well treatment agent and the at least one water-soluble well treatment agent dispersed in water; and (ii) a dispersing agent; or
  - (ii) the oil-soluble well treatment agent is a dispersed oil phase of an oil-in-water dispersion and wherein at least one of the following is also true:
    - (a) the oil-soluble treatment agent has a particle size distribution in the dispersion equal to or less than 2.5;
    - (b) the oil-soluble well treatment agent has an average particle size in the dispersion from about 0.005 to about 2 micrometers; or
    - (c) the oil-soluble well treatment agent has a volume average particle size from about 2 to about 5 microns.

* * * * *